United States Patent
Shi et al.

(10) Patent No.: US 12,375,235 B2
(45) Date of Patent: Jul. 29, 2025

(54) METHOD AND DEVICE FOR TRIGGERING APERIODIC SRS RESOURCE SET

(71) Applicant: VIVO MOBILE COMMUNICATION CO., LTD., Dongguan (CN)

(72) Inventors: Yuan Shi, Dongguan (CN); Rakesh Tamrakar, Dongguan (CN); Zhen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 456 days.

(21) Appl. No.: 17/870,787

(22) Filed: Jul. 21, 2022

(65) Prior Publication Data

US 2022/0368491 A1  Nov. 17, 2022

Related U.S. Application Data

(63) Continuation of application No. PCT/CN2021/072728, filed on Jan. 19, 2021.

(30) Foreign Application Priority Data

Jan. 22, 2020  (CN) .......................... 202010075487.5

(51) Int. Cl.
  *H04L 5/00* (2006.01)
  *H04W 72/0446* (2023.01)
  *H04W 72/23* (2023.01)

(52) U.S. Cl.
  CPC ....... *H04L 5/0048* (2013.01); *H04W 72/0446* (2013.01); *H04W 72/23* (2023.01)

(58) Field of Classification Search
  CPC ... H04L 5/0048; H04L 5/0092; H04L 5/0051; H04W 72/0446; H04W 72/23; H04W 76/27
  See application file for complete search history.

(56) References Cited

U.S. PATENT DOCUMENTS

2019/0268199 A1   8/2019  Shi et al.
2022/0330300 A1* 10/2022  Wang ................ H04L 27/26025

FOREIGN PATENT DOCUMENTS

| | | |
|---|---|---|
| CN | 109565840 A | 4/2019 |
| CN | 110034889 A | 7/2019 |
| CN | 110460416 A | 11/2019 |
| CN | 110650001 A | 1/2020 |
| WO | 2019214719 A1 | 11/2019 |

OTHER PUBLICATIONS

3GPP TSG RAN WG1 Meeting #98bis; R1-1910289; Chongqing, China, Oct. 14-20, 2019; Agenda Item: 7.2.14; Title: TEI proposal on aperiodic RS triggering offset; Source: ZTE, Sanechips (Year: 2019).*

(Continued)

*Primary Examiner* — Mohammed S Chowdhury
(74) *Attorney, Agent, or Firm* — IPX PLLC

(57) ABSTRACT

A method for triggering an aperiodic SRS resource set and a device are provided. The method includes: receiving downlink control information (DCI), where the DCI is used to activate an aperiodic sounding reference signal (SRS) unit; and sending the SRS unit in at least one valid window corresponding to the activated SRS unit, where there is at least one valid slot in the valid window.

20 Claims, 13 Drawing Sheets

(56) References Cited

OTHER PUBLICATIONS

3GPP TSG RAN WG1 Meeting #98bis; R1-1911520; Chongqing, China, Oct. 14-20, 2019; Agenda Item: 7.2.14; Title: TEI proposal on aperiodic RS triggering offset; Source: ZTE, Sanechips. (Year: 2019).*

International Search Report issued in corresponding International Application No. PCT/CN2021/072728, mailed April 8. 2021, 4 pages.

Zte et al, "TEI Proposal on Aperiodic RS Triggering Offset", 3GPP TSG RAN WG1 Meeting #98bis R1-1910289, Oct. 2019.

First Office Action issued in related Chinese Application No. 202010075487.5, mailed Jul. 4, 2022, 14 pages.

* cited by examiner

| | D | D | u | D | u | D | u | D | D |
|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | Set 1 | | Set 2 | | Set 3 | | |

Valid window

FIG. 2

| | D | D | u | D | u | D | u | D | D |
|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | Set 1 | | Set 2 | | Set 3 | | |

Valid window

FIG. 3

| D | D | u | D | u | D | u | D | u | D | D |
|---|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | | Set 1 | | Set 2 | | Set 3 | | |

FIG. 4

Valid window

| D | D | u | D | u | D | u | D | u | D | D |
|---|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | Set 1<br>Set 2 | | | | | Set 3 | | |

FIG. 5

Valid window

| Valid window | D | D | u | D | u | D | u | D | D | |
|---|---|---|---|---|---|---|---|---|---|---|
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | | Set 1<br>Set 2<br>Set 3 | | | | | | |

FIG. 6

| Valid window | D | D | u | D | u | D | u | D | u | D | |
|---|---|---|---|---|---|---|---|---|---|---|---|
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | Set 1 | | | | Set 2 | | | | Set 3 | |

FIG. 7

| Valid window | D | D | u | D | D | u | D | u | u | D | |
|---|---|---|---|---|---|---|---|---|---|---|---|
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| | PDCCH | | Set 1 | | Set 2 | | Set 3 | | | | |

FIG. 8

| Valid window 1 Valid window 2 Valid window 3 | D | D | u | D | u | D | u | D | u | u | D | |
|---|---|---|---|---|---|---|---|---|---|---|---|---|
| | | Slot n | Slot n+1 | Slot n+2 | Slot n+3 | Slot n+4 | Slot n+5 | Slot n+6 | Slot n+7 | Slot n+8 | Slot n+9 | Slot n+10 |
| | PDCCH | | Set 1 | | Set 2 | | Set 3 | | | | | |

FIG. 9

| | | | | | | | | | | | |
|---|---|---|---|---|---|---|---|---|---|---|---|
| | D | D | u | u | D | D | u | D | u | u | D |
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | Set 1 | | Set 2 | | Set 3 | | | | |

Valid window 1
Valid window 2
Valid window 3

FIG. 10

| | | | | | | | | | | | |
|---|---|---|---|---|---|---|---|---|---|---|---|
| | D | D | u | u | D | D | u | D | u | u | D |
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | Set 1 | | | Set 2 | | | Set 3 | | |

Valid window 1
Valid window 2
Valid window 3

| | D | D | u | D | u | D | D | u | u | D |
|---|---|---|---|---|---|---|---|---|---|---|
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | | Set 1 | | | | Set 2 | | | Set 3 | |

Valid window 1
Valid window 2
Valid window 3

FIG. 13

| | D | D | u | D | u | D | D | u | u | D |
|---|---|---|---|---|---|---|---|---|---|---|
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | Resource 1 | | Resource 2 | | Resource 3 | | | | | |

| D | D | u | D | u | D | u | D | u | u | D |
|---|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | Set | Resource 1 | | Resource 2 | | Resource 3 | | | | |

FIG. 14

| D | D | u | D | u | D | u | D | u | u | D |
|---|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | Resource 1 | | Resource 2 | | Resource 3 | | | | |

FIG. 15

| D | D | u | D | u | D | u | D | u | u | D |
|---|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | Set | Resource 1 | | Resource 2 | | Resource 3 | | | | |

FIG. 16

| D | D | u | D | u | D | u | D | u | u | D |
|---|---|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | | Resource 1 | | Resource 2 | | Resource 3 | | | | |

FIG. 17

| D | D | u | D | u | D | u | u | D |
|---|---|---|---|---|---|---|---|---|
| Slot n | Slot n+1 | Slot n+2 | Slot n+3 | Slot n+4 | Slot n+5 | Slot n+6 | Slot n+7 | Slot n+8 | Slot n+9 | Slot n+10 |
| PDCCH | Set | Resource 1 | | Resource 2 | | Resource 3 | | | | |

FIG. 18

| | D | D | u | D | u | D | u | D | u | u | D |
|---|---|---|---|---|---|---|---|---|---|---|---|
| | Slot n | Slot n+1 | Slot n+2 | Slot n+3 | Slot n+4 | Slot n+5 | Slot n+6 | Slot n+7 | Slot n+8 | Slot n+9 | Slot n+10 |
| Valid window | PDCCH | | Resource 1 | | Resource 2 | | Resource 3 | | | | |

FIG. 19

METHOD AND DEVICE FOR TRIGGERING APERIODIC SRS RESOURCE SET

CROSS-REFERENCE TO RELATED APPLICATIONS

This application is a continuation of International Application No. PCT/CN2021/072728, filed Jan. 19, 2021, which claims priority to Chinese Patent Application No. 202010075487.5, filed Jan. 22, 2020. The entire contents of each of the above-referenced applications are expressly incorporated herein by reference.

TECHNICAL FIELD

The present disclosure relates to the communications field, and in particular, to a method and device for triggering an aperiodic SRS resource set.

BACKGROUND

Currently, each Sounding Reference Signal (SRS) resource set defined in the protocol supports only one usage, and also supports only one aperiodic valid slot. After a valid slot of an aperiodic SRS resource set is configured through Radio Resource Control (RRC), and before RRC reconfiguration, valid slots in a plurality of SRS resource sets are fixed and cannot be changed. If a plurality of SRS resource sets is configured in this case, a network may send a plurality of pieces of Downlink Control Information (DCI) in a same slot to trigger different SRS resource sets. In this case, congestion of Physical Downlink Control Channel (PDCCH) resources is caused.

If a slot format may be changed by using signaling, after DCI signaling is sent, a slot format of an uplink symbol or an uplink slot triggered by the DCI signaling for sending an SRS resource may be dynamically modified by using signaling. In this case, the SRS resource cannot be sent, and triggering needs to be performed again in the network, thereby deepening congestion of the PDCCH resources.

For the foregoing problem, in the prior art, a valid window-based aperiodic activation method is used. That is, assuming that DCI used to trigger an aperiodic SRS resource set is sent in a slot n, the SRS resource set is sent in the $(n+x+y)^{th}$ valid slot, where n is a slot for sending a PDCCH, x is a slot offset of the SRS resource set, and y is a latest valid slot in a valid window. A disadvantage of this manner is that if a plurality of SRS resources are activated in a same slot, only an SRS resource activated by the last pieces of DCI is transmitted.

For antenna switching, two aperiodic SRS resource sets are configured during one transmit four-reception (1T4R for short) antenna switching, and the two SRS resource sets are activated by one piece of DCI at the same time. If the foregoing valid window-based aperiodic activation method is used, two SRS resource sets that should have been sent in different slots may be moved to a same slot for sending. If antenna switching cannot be completed in a same slot, antenna switching fails.

SUMMARY

Embodiments of the present disclosure provide a method and a device for triggering an aperiodic SRS resource set.

According to a first aspect, an embodiment of the present disclosure provides a method for triggering an aperiodic SRS resource set, where the method is applied to a terminal device and includes: receiving downlink control information (DCI), where the DCI is used to activate an aperiodic sounding reference signal SRS unit; and sending the SRS unit in at least one valid window corresponding to the activated SRS unit, where there is at least one valid slot in the valid window.

According to a second aspect, an embodiment of the present disclosure provides a method for triggering an aperiodic SRS resource set, where the method is applied to a network device and includes: sending downlink control information (DCI), where the DCI is used to activate an aperiodic sounding reference signal SRS unit; and receiving the SRS unit in at least one valid window corresponding to the activated SRS unit, where there is at least one valid slot in the valid window.

According to a third aspect, an embodiment of the present disclosure further provides a terminal device, including: a first receiving module, configured to receive downlink control information (DCI), where the DCI is used to activate an aperiodic sounding reference signal SRS unit; and a first sending module, configured to send the SRS unit in at least one valid window corresponding to the activated SRS unit, where there is at least one valid slot in the valid window.

According to a fourth aspect, an embodiment of the present disclosure further provides a network device, including: a second sending module, configured to send downlink control information (DCI), where the DCI is used to activate an aperiodic sounding reference signal SRS unit; and a second receiving module, configured to receive the SRS unit in at least one valid window corresponding to the activated SRS unit, where there is at least one valid slot in the valid window.

According to a fifth aspect, an embodiment of the present disclosure further provides a network device, including a memory storing a computer program instruction; and a processor, configured to: when the computer program instruction is executed by the processor, implement the method for triggering an aperiodic SRS resource set in the first aspect.

According to a sixth aspect, an embodiment of the present disclosure further provides a terminal device, including: a memory storing a computer program instruction; and a processor, configured to: when the computer program instruction is executed by the processor, implement the method for triggering an aperiodic SRS resource set in the second aspect.

According to a seventh aspect, an embodiment of the present disclosure further provides a computer-readable storage medium, where the computer-readable storage medium includes an instruction, and when the instruction runs on a computer, the computer executes the method for triggering an aperiodic SRS resource set in the first aspect or the second aspect.

In the embodiments of the present disclosure, the terminal device receives the downlink control information DCI, and sends the SRS unit, for example, a plurality of SRS resources in at least one SRS resource set or a plurality of SRS resource sets, in the at least one valid window corresponding to the aperiodic SRS unit activated by using the DCI, so that the network device can receive the SRS unit in the at least one valid window corresponding to the activated SRS unit. It can be learned that when the DCI is used to activate the SRS unit, sending and receiving of the SRS unit can be completed in the at least one valid window. Therefore, a problem that PDCCH resources are congested or antenna switching fails when at least one piece of DCI is used to simultaneously activate a plurality of SRS resources in at least one SRS resource set or a plurality of SRS resource sets is resolved, thereby implementing flexibility of activating the SRS unit by using the DCI.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments recorded in the present disclosure. It can be understood that other drawings can be still derived from these accompanying drawings.

FIG. 2 to FIG. 20 are schematic structural diagrams of slots in a method for triggering an aperiodic SRS resource set according to embodiments of the present disclosure;

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The technical solutions in the present disclosure can be applied to various communications systems, such as a Global System for Mobile Communications (GSM), a Code Division Multiple Access (CDMA) system, a Wideband Code Division Multiple Access (WCDMA) system, a General Packet Radio Service (GPRS) system, a Long Term Evolution (LTE)/Long Term Evolution-advanced (LTE-A) system, and a New Radio (NR) system.

A terminal device (User Equipment, UE) may also be referred to as a mobile terminal, a mobile terminal device, and the like. The terminal device may communicate with one or more core networks by using a Radio Access Network (RAN). The user equipment may be a terminal device such as a mobile phone (or referred to as a "cellular" phone), or a computer having a terminal device. For example, the terminal device may be a portable, pocket-sized, handheld, computer built-in, or in-vehicle mobile apparatus, which exchanges voice and/or data with the radio access network.

A network device may also be referred to as a base station, and may be a Base Transceiver Station (BTS) in GSM or CDMA, may be a NodeB in WCDMA, or may be an evolved NodeB (eNB or e-NodeB) in LTE and a 5G base station (gNB). This is not limited in the present disclosure.

The following describes in detail the technical solutions provided in the embodiments of the present disclosure with reference to the accompanying drawings.

Figure 1A:
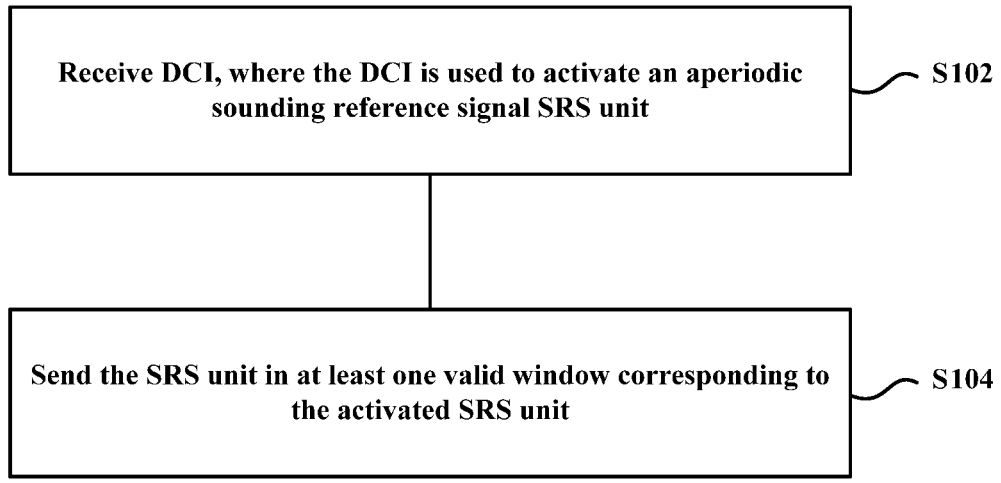
FIG. 1(a) is a method flowchart of a method for triggering an aperiodic SRS resource set according to an embodiment of the present disclosure.
Figure 1B:
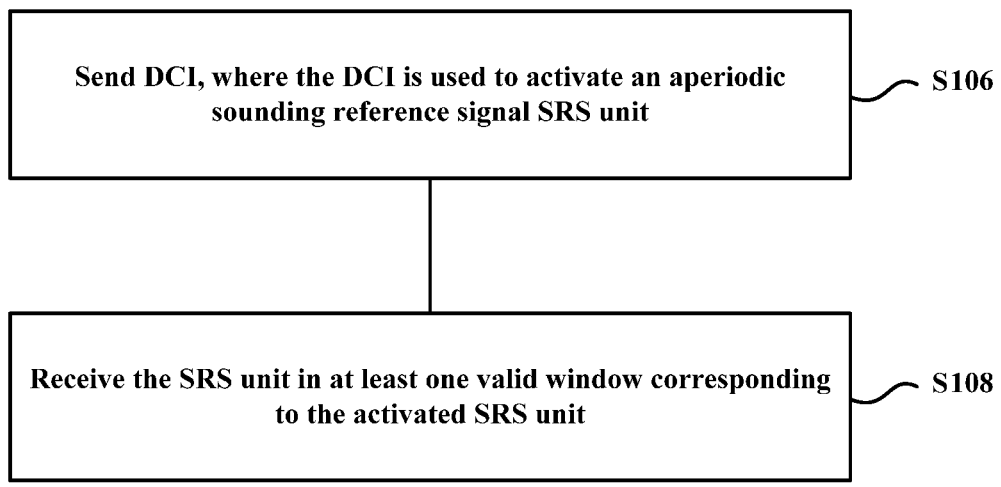
FIG. 1(b) is a method flowchart of a method for triggering an aperiodic SRS resource set according to an embodiment of the present disclosure.

FIG. 1 (a) and FIG. 1 (b) are respectively schematic flowcharts of a method for triggering an aperiodic SRS resource set according to an embodiment of the present disclosure. The method may be performed by an electronic device, such as a network device or a terminal device. In other words, the method may be performed by software or hardware installed in the network device or the terminal device. The method in FIG. 1 (a) is applied to a terminal device, and may include the following steps.

S102. Receive DCI, where the DCI is used to activate an aperiodic sounding reference signal SRS unit.

The SRS unit includes a plurality of SRS resources in one SRS resource set or a plurality of SRS resource sets. The DCI is delivered by a network device on a PDCCH.

S104. Send the SRS unit in at least one valid window corresponding to the activated SRS unit.

There is at least one valid slot in the valid window.

The method in FIG. 1 (b) is applied to a network device, and may include the following steps.

S106. Send DCI, where the DCI is used to activate an aperiodic sounding reference signal SRS unit.

S108. Receive the SRS unit in at least one valid window corresponding to the activated SRS unit.

There is at least one valid slot in the valid window.

In this embodiment, the valid window may be agreed upon by the network device and the terminal device by using a protocol, or may be configured by the network device. A time domain characteristic of the SRS unit is consistent with time domain characteristics of a plurality of SRS resources in one SRS resource set or a plurality of SRS resource sets included in the SRS unit, that is, all are aperiodic. In the following embodiments, all referenced SRS resource sets or SRS resources are aperiodic.

In this embodiment of the present disclosure, the terminal device receives the downlink control information DCI, and sends the SRS unit (for example, a plurality of SRS resources in at least one SRS resource set or a plurality of SRS resource sets) in the at least one valid window corresponding to the aperiodic SRS unit activated by using the DCI, so that the network device can receive the SRS unit in the at least one valid window corresponding to the activated SRS unit. It can be learned that when the DCI is used to activate the SRS unit, sending and receiving of the SRS unit can be completed in the at least one valid window. Therefore, a problem that PDCCH resources are congested or antenna switching fails when at least one piece of DCI is used to simultaneously activate a plurality of SRS resources in at least one SRS resource set or a plurality of SRS resource sets is resolved, thereby implementing flexibility of activating the SRS unit by using the DCI.

In an embodiment, the network device may configure parameter information of the SRS unit. The parameter information includes a slot offset corresponding to the SRS unit.

The following separately describes a scenario in which the SRS unit includes a plurality of SRS resources in one SRS resource set and a scenario in which the SRS unit includes a plurality of SRS resource sets in a plurality of embodiments.

Scenario 1: The SRS unit includes a plurality of SRS resource sets. The parameter information includes at least one valid window and a slot offset corresponding to each SRS resource set.

In an embodiment, when the network device configures parameter information of the plurality of SRS resource sets, any one of the following manners A1 to 3 may be used to configure slot offsets corresponding to the plurality of SRS resource sets:

A1. In a case that the terminal device can only send the SRS resource sets in a same valid slot, configure a same slot offset for the SRS resource sets.

This manner is mainly for terminal devices in Rel 17 and subsequent releases. The case in which the terminal device can only send the SRS resource sets in the same valid slot is equivalent to that a quantity of SRS symbols that the terminal device can place SRS resources in all extended SRS symbols, for example, all 14 symbols (currently, the SRS resources can only be configured on the last six symbols).

A2. Configure different slot offsets for the SRS resource sets.

A3. Configure a same slot offset for a part of the SRS resource sets. That is, a same slot offset is configured for a part of the plurality of SRS resource sets, and a different slot offset is configured for the other part of the SRS resource sets.

A slot offset corresponding to each SRS resource set is used to indicate a time domain location of each SRS resource set. The time domain location of the SRS resource set includes a time domain location of each SRS resource set relative to a second initial slot; or the time domain location of the SRS resource set includes a time domain location of the first SRS resource set in an SRS resource set sequence relative to the second initial slot and a time domain location of each SRS resource set relative to a previous SRS resource set.

The SRS resource set sequence is determined based on at least one of the following: a slot offset corresponding to each SRS resource set, a resource identifier of an SRS resource included in each SRS resource set, or a symbol location in each SRS resource.

A mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

where n is the second initial slot, m is the first initial slot, and $\mu_{SRS}$ corresponds to a subcarrier spacing of the SRS unit, that is, the subcarrier spacing of the SRS unit is $15*2^{\mu_{SRS}}$ (KHz). $\mu_{PDCCH}$ corresponds to a subcarrier spacing of a PDCCH, that is, the subcarrier spacing of the PDCCH is $15*2^{\mu_{PDCCH}}$ (KHz). The symbol "⌈ ⌉" represents rounding up, and the symbol "⌊ ⌋" represents rounding down.

In an embodiment, the parameter information further includes a usage. Based on this, when configuring the parameter information of the plurality of SRS resource sets, the network device may further configure the same usage for the SRS resource sets.

Based on the slot offset configuration manner used by the network device in the foregoing embodiment, the terminal device may send the SRS resource sets in any one or more of the following manners:

Manner 1: The terminal device sends the plurality of SRS resource sets in different valid slots.

For example, the terminal device sends an SRS resource set 1 in a valid slot 1, and sends an SRS resource set 2 in a valid slot 2.

Manner 2: The terminal device sends at least one SRS resource set at different symbol locations of a same valid slot.

For example, the terminal device sends an SRS resource set 1 at a symbol location 1 of a valid slot 1, and sends an SRS resource set 2 at a symbol location 2 of the valid slot 1.

If the SRS resource sets are sent by combining the manner 1 with the manner 2, for example, an SRS resource set 1 and an SRS resource set 2 are separately sent at different symbol locations of a valid slot 1, and an SRS resource set 3 and an SRS resource set 4 are separately sent at different symbol locations of a valid slot 2.

In an embodiment, the terminal device may sequentially send each SRS resource set in at least one valid slot in a valid window according to an SRS resource set sequence. The SRS resource set sequence is determined based on at least one of the following: a slot offset corresponding to each SRS resource set, a resource identifier of an SRS resource included in each SRS resource set, or a symbol location in each SRS resource. In some embodiments, the SRS resource set sequence may be determined in an ascending order or a descending order of values, for example, at least one of a slot offset corresponding to each SRS resource set, a resource identifier of each SRS resource, or a symbol location in each SRS resource.

When sequentially sending each SRS resource set in at least one valid slot according to the SRS resource set sequence, the terminal device may send the SRS resource sets in different sending manners according to different window starting points of valid windows and different offset starting points of slot offsets of the SRS resource sets.

Manner 1: The terminal device sends the $u^{th}$ SRS resource set in the $(n+x_u+y_u)^{th}$ valid slot, where n is a second initial slot, $x_u$ is a slot offset corresponding to the $u^{th}$ SRS resource set, and $y_u$ is a slot offset of a valid slot corresponding to the $u^{th}$ SRS resource set relative to the second initial slot and the $u^{th}$ SRS resource set.

In the manner 1, each SRS resource set corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set.

An offset starting point of the slot offset corresponding to each SRS resource set is the second initial slot.

In the manner 1, the valid window may or may not include a window starting point. The slot offset may or may not include an offset starting point. $y_u$ may be less than or equal to a length of the valid window. $y_u$ may be greater than or equal to $y_{u-1}$. $y_{u-1}$ is a slot offset of a valid slot corresponding to the $(u-1)^{th}$ SRS resource relative to the second initial slot and the $(u-1)^{th}$ SRS resource.

For example, the second initial slot is a slot n, and the offset starting point of the slot offset corresponding to each SRS resource set is the second initial slot. In this case, the first SRS resource set may be sent in the $(n+x_1+y_1)^{th}$ valid slot, where $y_1 \leq z$, and z represents a length of the valid window. The second SRS resource set is sent in the $(n+x_2+y_2)^{th}$ valid slot, where $y_2 \leq z$, and $y_2 > y_1$ or $y_2 \geq y_1$. By analogy, all SRS resource sets are sent in this way.

Manner 2: The terminal device sends the $u^{th}$ SRS resource set in the $(n+\Sigma_{i=1}^{u} x_i+\Sigma_{i=1}^{u} y_i)^{th}$ valid slot, where n is a second initial slot, $x_i$ is a slot offset corresponding to the $i^{th}$ SRS resource set, $y_i$ is a slot offset obtained after a valid slot corresponding to the $i^{th}$ SRS resource set is shifted by $x_i$ relative to a valid slot corresponding to the $(i-1)^{th}$ SRS resource set, and $y_1$ is a slot offset obtained after a valid slot corresponding to the first SRS resource set is shifted by $x_1$ relative to the second initial slot.

In the manner 2, each SRS resource set corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set.

An offset starting point of a slot offset corresponding to the first SRS resource set is the second initial slot, and an offset starting point of a slot offset corresponding to each of other SRS resource sets except the first SRS resource set is a valid slot corresponding to a previous SRS resource set.

In addition, in the manner 2, in a case that each SRS resource set corresponds to one valid window, a length of the valid window corresponding to each SRS resource set is less than or equal to a length of a valid window corresponding to a previous SRS resource set; or a length of the valid window corresponding to each SRS resource set is greater than or equal to a length of a valid window corresponding to a previous SRS resource set.

In the manner 2, the valid window may or may not include a window starting point. The slot offset may or may not include an offset starting point. $y_u$ may be less than or equal to a length of the valid window. $y_u$ may be greater than or equal to $y_{u-1}$. $y_{u-1}$ is a slot offset of a valid slot corresponding to the $(u-1)^{th}$ SRS resource relative to the second initial slot and the $(u-1)^{th}$ SRS resource.

For example, the second initial slot is a slot n, and the first SRS resource set may be sent in the $(n+x_1+y_1)^{th}$ valid slot, where $y_1 \leq z_1$. The second SRS resource set is sent in the $(n+x_1+x_2+y_1+y_2)^{th}$ valid slot, where $y_2 \leq z_2$. By analogy, all SRS resource sets are sent in this way. $z_u$ represents a length of a valid window (that is, the $u^{th}$ valid window) corresponding to the $u^{th}$ SRS resource set, and a value of $z_u$ (that is, a value of the valid window) may be configured by the network device in any one of the following manners (1) to (4):

(1) Directly configure the value of the at least one valid window.

(2) Configure values of a part of the at least one valid window, and configure a mapping relationship between the valid windows.

The mapping relationship between the valid windows is configured by the network device or agreed upon by the network device and the terminal device by using a protocol.

In some embodiments, only a value of the first valid window is configured, and a mapping relationship between other valid windows and the first valid window is configured. A value of each valid window may be determined based on the mapping relationship between the others valid window and the first valid window. For example, only a value of $z_1$ and a mapping relationship $z_u = a_{u-1} * z_{u-1}$ are configured, where $a_{u-1}$ is configured by the network device or is agreed upon by using a protocol. For another example, only a value of $z_1$ and a mapping relationship $z_u = b * z_{u-1}$ are configured, where b is configured by the network device or is agreed upon by using a protocol.

(3) In a case that the terminal device reports values of a plurality of valid windows, configure the value of the at least one valid window based on the values of the plurality of valid windows.

In some embodiments, if the terminal device reports the values of the plurality of valid windows, the network device may select one value from the values of the plurality of valid windows for use.

(4) In a case that the terminal device reports only a value of one valid window, use the value of the valid window reported by the terminal device.

In the foregoing g embodiment, the valid slot is the first slot in which available symbol resources of all SRS resources in one SRS resource set can be transmitted in a valid window corresponding to the SRS resource set; and/or the valid slot is the first slot in which available symbol resources of one SRS resource can be transmitted in a valid window corresponding to the SRS resource.

In an embodiment, the valid slot may meet a requirement for a minimum time interval between DCI and an SRS resource.

The requirement for the minimum time interval between the DCI and the SRS resource is:

if the usage is configured as a codebook or antenna switching, a minimum time interval between the last symbol of a PDCCH that carries the DCI and the activated SRS resource is N2; and if the usage is configured as a non-codebook or BM, a minimum time interval between the last symbol of the PDCCH that carries the DCI and the activated SRS resource is N2+14.

A unit of N2 is a symbol, and is obtained through calculation according to the PDCCH and a minimum Sub-Carrier Spacing (SCS) in the activated SRS resource.

In an embodiment, the valid slot may further meet a requirement for a guard interval of antenna switching.

In an embodiment, the valid slot may include an available resource that can be used for uplink transmission.

In an embodiment, the valid window is infinitely long or is invalid.

Scenario 2: The SRS unit includes at least one SRS resource in one SRS resource set. The parameter information includes a slot offset corresponding to the SRS resource set and a slot offset corresponding to the at least one SRS resource; or the parameter information includes a slot offset corresponding to the at least one SRS resource.

In an embodiment, when the network device configures the parameter information of the SRS unit, any one of the following manners B1 to B2 may be used to configure a slot offset corresponding to the SRS unit:

B1: Configure the slot offset corresponding to the SRS resource set and the slot offset corresponding to the at least one SRS resource, where the slot offset corresponding to the SRS resource set is valid or invalid.

B2: Configure only the slot offset corresponding to the at least one SRS resource.

The slot offset corresponding to the SRS resource set is used to indicate a time domain location of the SRS resource set relative to a second initial slot, and the slot offset corresponding to the at least one SRS resource is used to indicate a time domain location of the at least one SRS resource.

In an embodiment, the time domain location of the at least one SRS resource includes a time domain location of each SRS resource relative to a second initial slot; or the time domain location of the at least one SRS resource includes a time domain location of the first SRS resource in an SRS resource sequence relative to the second initial slot and a time domain location of each SRS resource relative to a previous SRS resource.

The SRS resource sequence is determined based on at least one of the following: a slot offset corresponding to each SRS resource, a resource identifier of each SRS resource, or a symbol location in each SRS resource.

In an embodiment, the network device configures the slot offset corresponding to the SRS resource in an aperiodic field of the SRS resource.

A mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

where n is the second initial slot, m is the first initial slot, and $\mu_{SRS}$ corresponds to a subcarrier spacing of the SRS unit, that is, the subcarrier spacing of the SRS unit is $15*2^{\mu_{SRS}}$ (KHz). $\mu_{PDCCH}$ corresponds to a subcarrier spacing of a PDCCH, that is, the subcarrier spacing of the PDCCH is $15*2^{\mu_{PDCCH}}$ (KHz). The symbol "⌈ ⌉" represents rounding up, and the symbol "⌊ ⌋" represents rounding down.

Based on different slot offset configuration manners used by the network device in the foregoing embodiment, the terminal device correspondingly sends at least one SRS resource in one SRS resource set in the following manners:

The terminal device directly sends the at least one SRS resource in a valid slot corresponding to the at least one SRS resource. The valid slot corresponding to the at least one SRS resource is determined based on the slot offset corresponding to the at least one SRS resource, or the valid slot corresponding to the at least one SRS resource is determined based on the slot offset corresponding to the SRS resource set and the slot offset corresponding to the at least one SRS resource.

In some embodiments, the terminal device sequentially sends each SRS resource in at least one valid slot in a valid window according to an SRS resource sequence. The SRS resource sequence is determined based on at least one of the following: a slot offset corresponding to each SRS resource, a resource identifier of each SRS resource, or a symbol location in each SRS resource. In some embodiments, the SRS resource sequence may be determined in an ascending order or a descending order of values, for example, at least one of a slot offset corresponding to each SRS resource, a resource identifier of each SRS resource, or a symbol location in each SRS resource.

When sequentially sending each SRS resource in the at least one valid slot in the valid window according to the SRS resource sequence, the terminal device may send the SRS resources in different sending manners according to different window starting points of valid windows, different offset starting points of the slot offset corresponding to the SRS resource set, and different offset starting points of slot offsets corresponding to the SRS resources.

Manner 1: In a case that the slot offset corresponding to the SRS resource set is not configured or invalid, send the $u^{th}$ SRS resource in the $(n+x_u+y_u)^{th}$ valid slot, where an offset starting point of the slot offset corresponding to each SRS resource is a second initial slot; or in a case that the slot offset corresponding to the SRS resource set is configured and valid, send the $u^{th}$ SRS resource in the $(n+x+x_u+y_u)^{th}$ valid slot, where n is a second initial slot, x is the slot offset corresponding to the SRS resource set, an offset starting point of the slot offset corresponding to the SRS resource set is the second initial slot, and an offset starting point of the slot offset corresponding to each SRS resource is a valid slot corresponding to the SRS resource set, where $x_u$ is a slot offset corresponding to the $u^{th}$ SRS resource, and $y_u$ is a slot offset of a valid slot corresponding to the $u^{th}$ SRS resource relative to the second initial slot and the $u^{th}$ SRS resource; and each SRS resource corresponds to at least one valid window, and a window starting point of each of the at least one valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource.

In the manner 1, the valid window may or may not include a window starting point. The slot offset may or may not include an offset starting point. $y_u$ may be less than or equal to a length of the valid window. $y_u$ may be greater than or equal to $y_{u-1}$. $y_{u-1}$ is a slot offset of a valid slot corresponding to the $(u-1)^{th}$ SRS resource relative to the second initial slot and the $(u-1)^{th}$ SRS resource.

For example, the second initial slot is a slot n, the offset starting points of the slot offset corresponding to the SRS resource set and the slot offset corresponding to each SRS resource are the second initial slot, and the slot offset corresponding to the SRS resource set is configured and valid. In this case, the first SRS resource may be sent in the $(n+x+x_1+y_1)^{th}$ valid slot, where $y_1 \leq z$, and z represents a length of the valid window. The second SRS resource is sent in the $(n+x+x_2+y_2)^{th}$ valid slot, where $y_2 \leq z$, and $y_2 > y_1$ or $y_2 \leq y_1$. By analogy, all SRS resources are sent in this way.

Manner 2: In a case that the slot offset corresponding to the SRS resource set is not configured or invalid, send the $u^{th}$ SRS resource in the $(n+\Sigma_{i=1}^{u}x_i+\Sigma_{i=1}^{u}y_i)^{th}$ valid slot, where an offset starting point of a slot offset corresponding to the first SRS resource is a second initial slot, and an offset starting point of a slot offset corresponding to each of other SRS resources except the first SRS resource is a valid slot corresponding to a previous SRS resource; or in a case that the slot offset corresponding to the SRS resource set is configured and valid, sending the $u^{th}$ SRS resource in the $(n+\Sigma_{i=1}^{u}x_i+\Sigma_{i=1}^{u}y_i)^{th}$ valid slot, where an offset starting point of the slot offset corresponding to the SRS resource set is a second initial slot, an offset starting point of a slot offset corresponding to the first SRS resource is a valid slot corresponding to the SRS resource set, and an offset starting point of a slot offset corresponding to each of other SRS resources except the first SRS resource is a valid slot corresponding to a previous SRS resource, where n is the second initial slot, x is the slot offset corresponding to the SRS resource set, $x_i$ is a slot offset corresponding to the $i^{th}$ SRS resource, $y_i$ is a slot offset obtained after a valid slot corresponding to the $i^{th}$ SRS resource is shifted by $x_i$ relative to a valid slot corresponding to the $(i-1)^{th}$ SRS resource, and $y_1$ is a slot offset obtained after a valid slot corresponding to the first SRS resource set is shifted by $x_1$ relative to the second initial slot; and each SRS resource corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set.

In the manner 2, in a case that each SRS resource corresponds to one valid window, a length of the valid window corresponding to each SRS resource is less than or equal to a length of a valid window corresponding to a previous SRS resource; or a length of the valid window corresponding to each SRS resource is greater than or equal to a length of a valid window corresponding to a previous SRS resource.

In the manner 2, the valid window may or may not include a window starting point. The slot offset may or may not include an offset starting point. $y_u$ may be less than or equal to a length of the valid window. $y_u$ may be greater than or equal to $y_{u-1}$. $y_{u-1}$ is a slot offset of a valid slot corresponding to the $(u-1)^{th}$ SRS resource relative to the second initial slot and the $(u-1)^{th}$ SRS resource.

For example, the second initial slot is a slot n, the offset starting point of the slot offset corresponding to the SRS resource set is the second initial slot, the offset starting point of the slot offset corresponding to the first SRS resource is the valid slot corresponding to the SRS resource set, and the offset starting point of the slot offset corresponding to each of the other SRS resources except the first SRS resource is a valid slot corresponding to a previous SRS resource. The slot offset corresponding to the SRS resource set is configured and valid. In this case, the first SRS resource set may be sent in the $(n+x+x_1+y_1)$th valid slot, where $y_1 \leq z_1$. The second SRS resource set is sent in the $(n+x+x_1+x_2+y_1+y_2)$th valid slot, where $y_2 \leq z_2$. By analogy, all SRS resource sets are sent in this way. $z_u$ represents a length of a valid window (that is, the uth valid window) corresponding to the uth SRS resource set, and a value of $z_u$ (that is, a value of the valid window) may be configured by the network device in any one of the following manners (1) to (4):

(1) Directly configure the value of the at least one valid window.

(2) Configure values of a part of the at least one valid window, and configure a mapping relationship between the valid windows.

The mapping relationship between the valid windows is configured by the network device or agreed upon by the network device and the terminal device by using a protocol.

In some embodiments, only a value of the first valid window is configured, and a mapping relationship between other valid windows and the first valid window is configured. A value of each valid window may be determined based on the mapping relationship between the others valid window and the first valid window. For example, only a value of $z_1$ and a mapping relationship $z_u = a_{u-1} * z_{u-1}$ are configured, where $a_{u-1}$ is configured by the network device or is agreed upon by using a protocol. For another example, only a value of $z_1$ and a mapping relationship $z_u = b * z_{u-1}$ are configured, where b is configured by the network device or is agreed upon by using a protocol.

(1) In a case that the terminal device reports values of a plurality of valid windows, configure the value of the at least one valid window based on the values of the plurality of valid windows.

In some embodiments, if the terminal device reports the values of the plurality of valid windows, the network device may select one value from the values of the plurality of valid windows for use.

(2) In a case that the terminal device reports only a value of one valid window, use the value of the valid window reported by the terminal device.

In an embodiment, the valid window is infinitely long or is invalid.

In an g embodiment, the valid slot is the first slot in which available symbol resources of all SRS resources in one SRS resource set can be transmitted in a valid window corresponding to the SRS resource set; and/or the valid slot is the first slot in which available symbol resources of one SRS resource can be transmitted in a valid window corresponding to the SRS resource.

In an embodiment, the valid slot may meet a requirement for a minimum time interval between DCI and an SRS resource.

The requirement for the minimum time interval between the DCI and the SRS resource is:
  if the usage is configured as a codebook or antenna switching, a minimum time interval between the last symbol of a PDCCH that carries the DCI and the activated SRS resource is N2; and
  if the usage is configured as a non-codebook or BM, a minimum time interval between the last symbol of the PDCCH that carries the DCI and the activated SRS resource is N2+14.

A unit of N2 is a symbol, and is obtained through calculation according to the PDCCH and a minimum SCS in the activated SRS resource.

In an embodiment, the valid slot may further meet a requirement for a guard interval of antenna switching.

In an embodiment, the valid slot may include an available resource that can be used for uplink transmission.

The following describes, by using several embodiments, the method for triggering an aperiodic SRS resource set provided in the foregoing embodiments.

In the following Embodiment 1 to Embodiment 4, the SRS unit includes a plurality of SRS resource sets.

Embodiment 1: Only one valid window is agreed upon.

It is assumed that one PDCCH is used to simultaneously activate three SRS resource sets, which are respectively as follows:
  SRS resource set 1: slot offset=4;
  SRS resource set 2: slot offset=6; and
  SRS resource set 3: slot offset=7.

FIG. 2 to FIG. 4 respectively show results of sending three SRS resource sets in a case in which starting points of a valid window and a slot offset are different. A gray part in the figure represents a valid window.

As shown in FIG. 2, a valid window is from a slot n to a slot n+9. A slot offset corresponding to each SRS resource set uses DCI (that is, the second initial slot n in the foregoing embodiment) as a starting point (including the slot n), a valid window uses the slot n as a starting point (including the slot n), and a length of the valid window is 10 slots. It can be learned from FIG. 2 that three SRS resource sets are successfully sent.

As shown in FIG. 3, a valid window is from a slot n to a slot n+7. A slot offset corresponding to each SRS resource set starts uses the slot n as a starting point (including the slot n), a valid window uses the slot n as a starting point (including the slot n), and a length of the valid window is 8 slots. It can be learned from FIG. 3 that sending of the set 3 fails.

As shown in FIG. 4, a valid window is from a slot n+1 to a slot n+8. A lot offset corresponding to each SRS resource set starts uses the slot n as a starting point (including the slot n), a valid window uses the slot n as a starting point (not including the slot n), and a length of the valid window is 8 slots. It can be learned from FIG. 4 that three SRS resource sets are successfully sent.

It is assumed that one PDCCH is used to simultaneously activate three SRS resource sets, which are respectively as follows:

SRS resource set 1: slot offset=3, where the set occupies 1 symbol with symbol location 0;

SRS resource set 2: slot offset=3, where the set occupies 2 symbols with symbol locations 5 and 6; and SRS resource set 3: slot offset=7, where the set occupies 4 symbols with symbol locations 0, 1, 2, and 3.

As shown in FIG. 5, a valid window is from a slot n+1 to a slot n+8. A lot offset corresponding to each SRS resource set starts uses the slot n as a starting point (not including the slot n), a valid window uses the slot n as a starting point (not including the slot n), and a length of the valid window is 8 slots. It can be learned from FIG. 5 that three SRS resource sets are successfully sent.

It is assumed that one PDCCH is used to simultaneously activate three SRS resource sets, which are respectively as follows:

SRS resource set 1: slot offset=3, where the set occupies 1 symbol with symbol location 0;

SRS resource set 2: slot offset=3, where the set occupies 2 symbols with symbol locations 5 and 6; and SRS resource set 3: slot offset=7, where the set occupies 4 symbols with symbol locations 1, 2, 3, and 4.

As shown in FIG. 6, a valid window is from a slot n+1 to a slot n+8. A lot offset corresponding to each SRS resource set starts uses the slot n as a starting point (not including the slot n), a valid window uses the slot n as a starting point (not including the slot n), and a length of the valid window is 8 slots. It can be learned from FIG. 6 that three SRS resource sets are successfully sent.

Embodiment 2: Only one valid window is agreed upon, and a starting point of a slot offset corresponding to each SRS resource set is a valid slot corresponding to a previous SRS resource set.

It is assumed that one PDCCH is used to simultaneously activate three SRS resource sets, which are respectively as follows:

SRS resource set 1: slot offset=2;
SRS resource set 2: slot offset=3; and
SRS resource set 3: slot offset=3.

FIG. 7 to FIG. 8 respectively show results of sending three SRS resource sets in a case in which starting points of a valid window and a slot offset are different. A gray part in the figure represents a valid window.

As shown in FIG. 7, a valid window is from a slot n+1 to a slot n+10. A slot offset corresponding to the first SRS resource set uses a slot n as a starting point (not including the slot n), and a slot offset corresponding to a subsequent SRS resource set uses a valid slot corresponding to a previous SRS resource set as a starting point (not including the slot). A valid window uses the slot n as a starting point (not including the slot n), and a length of the valid window is 10 slots. It can be learned from FIG. 7 that three SRS resource sets are successfully sent.

As shown in FIG. 8, a valid window is from a slot n+1 to a slot n+10. A slot offset corresponding to the first SRS resource set uses a slot n as a starting point (including or not including the slot n), and a slot offset corresponding to a subsequent SRS resource set uses a valid slot corresponding to a previous SRS resource set as a starting point (including the slot). A valid window uses the slot n as a starting point (not including the slot n), and a length of the valid window is 10 slots. It can be learned from FIG. 8 that three SRS resource sets are successfully sent.

In Embodiment 3: A plurality of valid windows are agreed upon, starting points of the plurality of valid windows are a slot n, and the valid windows include the slot n.

It is assumed that one PDCCH is used to simultaneously activate three SRS resource sets, which are respectively as follows:

SRS resource set 1: slot offset=2 and valid window 1=3;
SRS resource set 2: slot offset=3 and valid window 2=4; and
SRS resource set 3: slot offset=4 and valid window 3=6.

As shown in FIG. 9, the valid window 1 is from the slot n to a slot n+2, the valid window 2 is from the slot n to a slot n+3, the valid window 3 is from the slot n to a slot n+5, and a slot offset uses the slot n as a starting point (including the slot n). It can be learned from FIG. 9 that when a plurality of sets cannot be simultaneously sent in slots for sending SRS resources, sending of the set 3 fails.

It is assumed that one PDCCH is used to simultaneously activate three SRS resource sets, which are respectively as follows:

SRS resource set 1: slot offset=2 and valid window 1=3;
SRS resource set 2: slot offset=3 and valid window 2=4; and
SRS resource set 3: slot offset=4 and valid window 3=7.

As shown in FIG. 10, the valid window 1 is from the slot n to a slot n+2, the valid window 2 is from the slot n to a slot n+3, the valid window 3 is from the slot n to a slot n+6, and a slot offset uses the slot n as a starting point (including the slot n). It can be learned from FIG. 10 that when a plurality of sets cannot be simultaneously sent in slots for sending SRS resources, the three SRS resource sets can also be successfully sent.

Embodiment 4: A plurality of valid windows are agreed upon, the first valid window uses a slot n as a starting point (including a slot n), and a starting point of a subsequent valid window is an end location of a previous valid window. A slot offset of the first SRS resource set uses the slot n as a starting point (including or not including the slot n), and a slot offset of a subsequent SRS resource set uses the slot n as a starting point (not including the slot n).

It is assumed that one PDCCH is used to simultaneously activate three SRS resource sets, which are respectively as follows:

SRS resource set 1: slot offset=2 and valid window 1=3;
SRS resource set 2: slot offset=3 and valid window 2=3; and
SRS resource set 3: slot offset=3 and valid window 3=2.

As shown in FIG. 11, the valid window 1 is from the slot n to a slot n+2, the valid window 2 is from a slot n+3 to a slot n+5, and the valid window 3 is from a slot n+6 to a slot n+7. It can be learned from FIG. 11 that sending of the set 3 fails.

It is assumed that one PDCCH is used to simultaneously activate three SRS resource sets, which are respectively as follows:

SRS resource set 1: slot offset=2 and valid window 1=3;
SRS resource set 2: slot offset=3 and valid window 2=4; and
SRS resource set 3: slot offset=3 and valid window 3=4.

As shown in FIG. 12, the valid window 1 is from the slot n to a slot n+2, the valid window 2 is from a slot n+3 to a slot n+6, and the valid window 3 is from a slot n+7 to a slot n+10. It can be learned from FIG. 12 that three SRS resource sets are successfully sent.

In the following Embodiment 5 to Embodiment 9, the SRS unit includes a plurality of SRS resources in one SRS resource set.

Embodiment 5: The agreed valid window uses a slot n as a starting point (including the slot n), and the valid window is invalid.

It is assumed that one PDCCH is used to activate one SRS resource set, and the SRS resource set includes three SRS resources, which are as follows:

SRS resource set: slot offset=invalid;
SRS resource 1: slot offset=3;
SRS resource 2: slot offset=5; and
SRS resource 3: slot offset=7.

As shown in FIG. 13, a slot offset corresponding to an SRS resource uses a slot n as a starting point (including the slot n). Each SRS resource is successfully sent.

It is assumed that one PDCCH is used to activate one SRS resource set, and the SRS resource set includes three SRS resources, which are as follows:

SRS resource set: slot offset=2;
SRS resource 1: slot offset=2;
SRS resource 2: slot offset=4; and
SRS resource 3: slot offset=6.

As shown in FIG. 14, a slot offset corresponding to an SRS resource set uses a slot n as a starting point (including the slot n), and a slot offset corresponding to a subsequent SRS resource uses a valid slot corresponding to the SRS resource set as a starting point. Each SRS resource is successfully sent.

Embodiment 6: The agreed valid window uses a slot n as a starting point (not including the slot n), and the valid window is invalid.

It is assumed that one PDCCH is used to activate one SRS resource set, and the SRS resource set includes three SRS resources, which are as follows:

SRS resource set: slot offset=invalid;
SRS resource 1: slot offset=2;
SRS resource 2: slot offset=4; and
SRS resource 3: slot offset=6.

As shown in FIG. 15, a slot offset corresponding to each SRS resource uses a slot n as a starting point. Each SRS resource is successfully sent.

It is assumed that one PDCCH is used to activate one SRS resource set, and the SRS resource set includes three SRS resources, which are as follows:

SRS resource set: slot offset=1;
SRS resource 1: slot offset=2;
SRS resource 2: slot offset=4; and
SRS resource 3: slot offset=6.

As shown in FIG. 16, a slot offset corresponding to an SRS resource set uses a slot n as a starting point, and a slot offset corresponding to a subsequent SRS resource uses a valid slot corresponding to the SRS resource set as a starting point. Each SRS resource is successfully sent.

Embodiment 7: The agreed valid window is not invalid. A slot offset corresponding to an SRS resource set uses a slot n as a starting point (not including the slot n), and a slot offset corresponding to each subsequent SRS resource uses a valid slot corresponding to a previous SRS resource as a starting point (not including the slot).

It is assumed that one PDCCH is used to activate one SRS resource set, and the SRS resource set includes three SRS resources, which are as follows:

SRS resource set: slot offset=invalid;
SRS resource 1: slot offset=2;
SRS resource 2: slot offset=2; and
SRS resource 3: slot offset=2.

As shown in FIG. 17, a slot offset corresponding to the first SRS resource uses a slot n as a starting point, and a slot offset corresponding to each subsequent SRS resource uses a valid slot corresponding to a previous SRS resource as a starting point. Each SRS resource is successfully sent.

It is assumed that one PDCCH is used to activate one SRS resource set, and the SRS resource set includes three SRS resources, which are as follows:

SRS resource set: slot offset=1;
SRS resource 1: slot offset=1;
SRS resource 2: slot offset=2; and
SRS resource 3: slot offset=2.

As shown in FIG. 18, a slot offset corresponding to the first SRS resource set uses a slot n as a starting point, a slot offset corresponding to the first SRS resource uses a valid slot corresponding to the first SRS resource set as a starting point, and a slot offset corresponding to each subsequent SRS resource uses a valid slot corresponding to a previous SRS resource as a starting point. Each SRS resource is successfully sent.

Embodiment 8: Only one valid window is agreed upon, and the valid window uses a slot n as a starting point (not including the slot n).

It is assumed that one PDCCH is used to activate one SRS resource set, and the SRS resource set includes three SRS resources, which are as follows:

SRS resource set: slot offset=invalid;
valid window=8, excluding slot n;
SRS resource 1: slot offset=2;
SRS resource 2: slot offset=3; and
SRS resource 3: slot offset=5.

As shown in FIG. 19, a valid window is from a slot n+1 to a slot n+8. A slot offset corresponding to each SRS resource uses the slot n as a starting point. Each SRS resource is successfully sent.

Embodiment 9: A plurality of valid windows are agreed upon, and the valid windows use a slot n as a starting point (not including the slot n).

It is assumed that one PDCCH is used to activate one SRS resource set, and the SRS resource set includes three SRS resources, which are as follows:

SRS resource set: slot offset=invalid;
SRS resource 1: slot offset=2 and valid window 1=3;
SRS resource 2: slot offset=3 and valid window 2=6; and
SRS resource 3: slot offset=5 and valid window 3=8.

Figure 20:
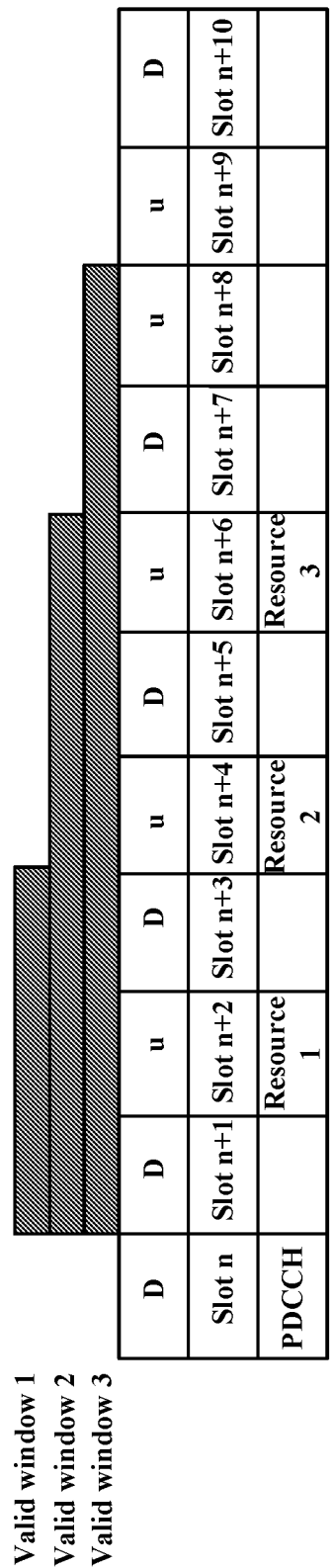

As shown in FIG. 20, the valid window 1 is from a slot n+1 to a slot n+3, the valid window 2 is from the slot n+1 to a slot n+6, and the valid window 3 is from the slot n+1 to a slot n+8. A slot offset corresponding to each SRS resource uses the slot n as a starting point. Each SRS resource is successfully sent.

It can be learned from the foregoing embodiments that, when the DCI is used to activate the SRS unit (for example, a plurality of SRS resources in at least one SRS resource set or a plurality of SRS resource sets), sending and receiving of the SRS unit can be completed in the at least one valid window. Therefore, a problem that PDCCH resources are congested or antenna switching fails when at least one piece of DCI is used to simultaneously activate a plurality of SRS resources in at least one SRS resource set or a plurality of SRS resource sets is resolved, thereby implementing flexibility of activating the SRS unit by using the DCI.

The above describes specific embodiments of this specification. Other embodiments are within the scope of the appended claims. In some cases, the actions or steps described in the claims can be performed in a different order from that in the embodiments and the desired result can still be achieved. In addition, the process described in the accompanying drawings does not necessarily achieve the desired result in a specific order shown or a continuous order. In some implementations, multiple-task processing and parallel processing are also possible or may be advantageous.

Figure 21:
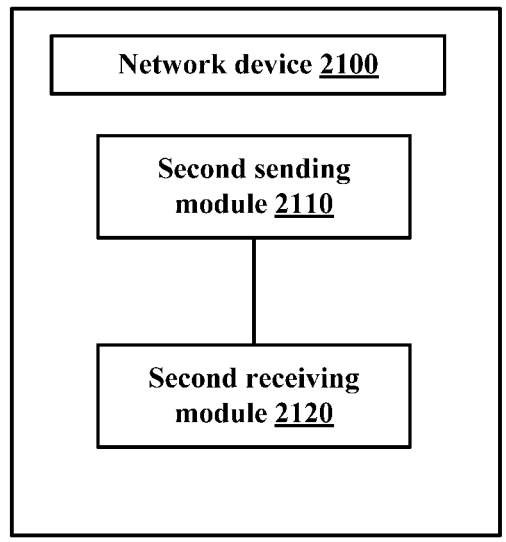
FIG. 21 is a schematic structural diagram of a network device according to an embodiment of the present disclosure.

FIG. 21 is a schematic structural diagram of a network device according to an embodiment of the present disclosure. Referring to FIG. 21, the network device 2100 may include:

a second sending module 2110, configured to send downlink control information DCI, where the DCI is used to activate an aperiodic sounding reference signal SRS unit; and a second receiving module 2120, configured to receive the SRS unit in at least one valid window corresponding to the activated SRS unit.

In an embodiment, the network device 2100 further includes:

a configuration module, configured to configure parameter information of the aperiodic SRS unit.

In an embodiment, the SRS unit includes a plurality of SRS resource sets; and the configuration module is further configured to:

in a case that a terminal device can only send the SRS resource sets in a same valid slot, configure a same slot offset for the SRS resource sets; or configure different slot offsets for the SRS resource sets; or configure a same slot offset for a part of the SRS resource sets, where a slot offset corresponding to each SRS resource set is used to indicate a time domain location of each SRS resource set.

In an embodiment, the time domain location of the SRS resource set includes a time domain location of each SRS resource set relative to a second initial slot; or the time domain location of the SRS resource set includes a time domain location of the first SRS resource set in an SRS resource set sequence relative to the second initial slot and a time domain location of each SRS resource set relative to a previous SRS resource set; and the SRS resource set sequence is determined based on at least one of the following: a slot offset corresponding to each SRS resource set, a resource identifier of an SRS resource included in each SRS resource set, or a symbol location in each SRS resource.

In an embodiment, the parameter information includes a usage; and the configuration module is further configured to:

configure the same usage for the SRS resource set.

In an embodiment, the SRS unit includes at least one SRS resource in one SRS resource set; and the configuration module is further configured to:

configure a slot offset corresponding to the SRS resource set and a slot offset corresponding to the at least one SRS resource, where the slot offset corresponding to the SRS resource set is valid or invalid; or configure only a slot offset corresponding to the at least one SRS resource, where the slot offset corresponding to the SRS resource set is used to indicate a time domain location of the SRS resource set relative to a second initial slot, and the slot offset corresponding to the at least one SRS resource is used to indicate a time domain location of the at least one SRS resource.

In an embodiment, the time domain location of the at least one SRS resource includes a time domain location of each SRS resource relative to the second initial slot; or the time domain location of the at least one SRS resource includes a time domain location of the first SRS resource in an SRS resource sequence relative to the second initial slot and a time domain location of each SRS resource relative to a previous SRS resource; and the SRS resource sequence is determined based on at least one of the following: a slot offset corresponding to each SRS resource, a resource identifier of each SRS resource, or a symbol location in each SRS resource.

In an embodiment, the configuration module is further configured to:

configure the slot offset corresponding to the SRS resource in an aperiodic field of the SRS resource.

In an embodiment, a mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

where n is the second initial slot, m is the first initial slot, $\mu_{SRS}$ corresponds to a subcarrier spacing of the SRS unit, and $\mu_{PDCCH}$ corresponds to a subcarrier spacing of a PDCCH.

In an embodiment, the valid slot is the first slot in which available symbol resources of all SRS resources in one SRS resource set can be transmitted in a valid window corresponding to the SRS resource set; and/or the valid slot is the first slot in which available symbol resources of one SRS resource can be transmitted in a valid window corresponding to the SRS resource.

In an embodiment, the network device 2100 is further configured to configure a value of the at least one valid window in the following manner:

directly configuring the value of the at least one valid window; or configuring values of a part of the at least one valid window, and configuring a mapping relationship between the valid windows, where the mapping relationship is configured by the network device or agreed upon by the network device and a terminal device by using a protocol; or in a case that a terminal device reports values of a plurality of valid windows, configuring the value of the at least one valid window based on the values of the plurality of valid windows; or in a case that a terminal device reports only a value of one valid window, using the value of the valid window reported by the terminal device.

In an embodiment, the valid window is infinitely long or is invalid.

The network device provided in this embodiment of the present disclosure can implement the processes implemented by the network device in the foregoing method embodiment. To avoid repetition, details are not described herein again.

Figure 22:
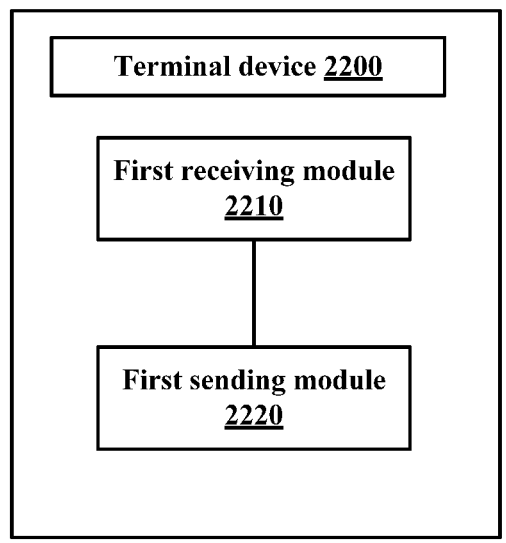
FIG. 22 is a schematic structural diagram of a terminal device according to an embodiment of the present disclosure.

FIG. 22 is a schematic structural diagram of a terminal device according to an embodiment of the present disclosure. Referring to FIG. 22, the terminal device 2200 includes:

a first receiving module 2210, configured to receive downlink control information DCI, where the DCI is used to activate an aperiodic sounding reference signal SRS unit; and a first sending module 2220, configured to send the SRS unit in at least one valid window corresponding to the activated SRS unit.

In an embodiment, the terminal device 2200 further includes:

an obtaining module, configured to obtain parameter information of the SRS unit, where the parameter information of the SRS unit is configured by a network device.

In an embodiment, the SRS unit includes a plurality of SRS resource sets, and the parameter information includes a slot offset corresponding to each SRS resource set; and the first sending module 2220 is further configured to perform at least one of the following:

sending the plurality of SRS resource sets in different valid slots; or sending at least one SRS resource set at different symbol locations of a same valid slot.

In an embodiment, the first sending module 2220 is further configured to:

sequentially send each SRS resource set in at least one valid slot in the slot window according to an SRS resource set sequence, where the SRS resource set sequence is determined based on at least one of the following: a slot offset corresponding to each SRS resource set, a resource identifier of each SRS resource included in each SRS resource set, or a symbol location in each SRS resource.

In an embodiment, the first sending module 2220 is further configured to:

send the $u^{th}$ SRS resource set in the $(n+x_u+y_u)^{th}$ valid slot, where n is a second initial slot, $x_u$ is a slot offset corresponding to the $u^{th}$ SRS resource set, and $y_u$ is a slot offset of a valid slot corresponding to the $u^{th}$ SRS resource set relative to the second initial slot and the $u^{th}$ SRS resource set, where each SRS resource set corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set; and an offset starting point of the slot offset corresponding to each SRS resource set is the second initial slot.

In an embodiment, the first sending module 2220 is further configured to:

send the $u^{th}$ SRS resource set in the $(n+\Sigma_{i=1}^{u}x_i+\Sigma_{i=1}^{u}y_i)^{th}$ valid slot, where n is a second initial slot, $x_i$ is a slot offset corresponding to the $i^{th}$ SRS resource set, $y_i$ is a slot offset obtained after a valid slot corresponding to the $i^{th}$ SRS resource set is shifted by $x_i$ relative to a valid slot corresponding to the $(i-1)^{th}$ SRS resource set, and $y_1$ is a slot offset obtained after a valid slot corresponding to the first SRS resource set is shifted by $x_1$ relative to the second initial slot;

each SRS resource set corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set; and an offset starting point of a slot offset corresponding to the first SRS resource set is the second initial slot, and an offset starting point of a slot offset corresponding to each of other SRS resource sets except the first SRS resource set is a valid slot corresponding to a previous SRS resource set.

In an embodiment, in a case that each SRS resource set corresponds to one valid window, a length of the valid window corresponding to each SRS resource set is less than or equal to a length of a valid window corresponding to a previous SRS resource set; or a length of the valid window corresponding to each SRS resource set is greater than or equal to a length of a valid window corresponding to a previous SRS resource set.

In an embodiment, the SRS unit includes at least one SRS resource in one SRS resource set; and the parameter information includes a slot offset corresponding to the SRS resource set and a slot offset corresponding to the at least one SRS resource, or the parameter information includes a slot offset corresponding to the at least one SRS resource; and the first sending module 2220 is further configured to:

send the at least one SRS resource in a valid slot corresponding to the at least one SRS resource, where the valid slot corresponding to the at least one SRS resource is determined based on the slot offset corresponding to the at least one SRS resource, or the valid slot corresponding to the at least one SRS resource is determined based on the slot offset corresponding to the SRS resource set and the slot offset corresponding to the at least one SRS resource.

In an embodiment, the first sending module 2220 is further configured to:

sequentially send each SRS resource in at least one valid slot in the slot window according to an SRS resource sequence, where the SRS resource sequence is determined based on at least one of the following: a slot offset corresponding to each SRS resource, a resource identifier of each SRS resource, or a symbol location in each SRS resource.

In an embodiment, the first sending module 2220 is further configured to:

in a case that the slot offset corresponding to the SRS resource set is not configured or invalid, send the $u^{th}$ SRS resource in the $(n+x_u+y_u)^{th}$ valid slot, where an offset starting point of the slot offset corresponding to each SRS resource is a second initial slot; or in a case that the slot offset corresponding to the SRS resource set is configured and valid, send the $u^{th}$ SRS resource in the $(n+x+x_u+y_u)^{th}$ valid slot, where n is a second initial slot, x is the slot offset corresponding to the SRS resource set, an offset starting point of the slot offset corresponding to the SRS resource set is the second initial slot, and an offset starting point of the slot offset corresponding to each SRS resource is a valid slot corresponding to the SRS resource set, where $x_u$ is a slot offset corresponding to the $u^{th}$ SRS resource, and $y_u$ is a slot offset of a valid slot corresponding to the $u^{th}$ SRS resource relative to the second initial slot and the $u^{th}$ SRS resource; and each SRS resource corresponds to at least one valid window, and a window starting point of each of the at least one valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource.

In an embodiment, the first sending module 2220 is further configured to:

in a case that the slot offset corresponding to the SRS resource set is not configured or invalid, sending the $u^{th}$ SRS resource in the $(n+\Sigma_{i=1}^{u} x_i + \Sigma_{i=1}^{u} y_i)^{th}$ valid slot, where an offset starting point of a slot offset corresponding to the first SRS resource is a second initial slot, and an offset starting point of a slot offset corresponding to each of other SRS resources except the first SRS resource is a valid slot corresponding to a previous SRS resource; or in a case that the slot offset corresponding to the SRS resource set is configured and valid, sending the $u^{th}$ SRS resource in the $(n+x+\Sigma_{i=1}^{u} x_i + \Sigma_{i=1}^{u} y_i)^{th}$ valid slot, where an offset starting point of the slot offset corresponding to the SRS resource set is a second initial slot, an offset starting point of a slot offset corresponding to the first SRS resource is a valid slot corresponding to the SRS resource set, and an offset starting point of a slot offset corresponding to each of other SRS resources except the first SRS resource is a valid slot corresponding to a previous SRS resource, where n is the second initial slot, x is the slot offset corresponding to the SRS resource set, $x_i$ is a slot offset corresponding to the $i^{th}$ SRS resource, $y_i$ is a slot offset obtained after a valid slot corresponding to the $i^{th}$ SRS resource is shifted by $x_i$ relative to a valid slot corresponding to the $(i-1)^{th}$ SRS resource, and $y_1$ is a slot offset obtained after a valid slot corresponding to the first SRS resource set is shifted by $x_1$ relative to the second initial slot; and each SRS resource corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set.

In an embodiment, in a case that each SRS resource corresponds to one valid window, a length of the valid window corresponding to each SRS resource is less than or equal to a length of a valid window corresponding to a previous SRS resource; or a length of the valid window corresponding to each SRS resource is greater than or equal to a length of a valid window corresponding to a previous SRS resource.

In an embodiment, $y_u$ is less than or equal to a length of the valid window.

In an embodiment, $y_u$ is greater than or equal to $y_{u-1}$; and $y_{u-1}$ is a slot offset of a valid slot corresponding to the $(u-1)^{th}$ SRS resource relative to the second initial slot and the $(u-1)^{th}$ SRS resource.

In an embodiment, a mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

where n is the second initial slot, m is the first initial slot, $\mu_{SRS}$ corresponds to a subcarrier spacing of the SRS unit, and $\mu_{PDCCH}$ corresponds to a subcarrier spacing of a PDCCH.

In an embodiment, the valid window includes or does not include the window starting point, and the slot offset includes or does not include the offset starting point.

In an embodiment, the valid slot is the first slot in which available symbol resources of all SRS resources in one SRS resource set can be transmitted in a valid window corresponding to the SRS resource set; and/or the valid slot is the first slot in which available symbol resources of one SRS resource can be transmitted in a valid window corresponding to the SRS resource.

In an embodiment, the valid window is infinitely long or is invalid.

In the foregoing embodiment, the terminal device receives the downlink control information DCI, and sends the SRS unit (for example, a plurality of SRS resources in at least one SRS resource set or a plurality of SRS resource sets) in the at least one valid window corresponding to the aperiodic SRS unit activated by using the DCI, so that the network device can receive the SRS unit in the at least one valid window corresponding to the activated SRS unit. It can be learned that when the DCI is used to activate the SRS unit, sending and receiving of the SRS unit can be completed in the at least one valid window. Therefore, a problem that PDCCH resources are congested or antenna switching fails when at least one piece of DCI is used to simultaneously activate a plurality of SRS resources in at least one SRS resource set or a plurality of SRS resource sets is resolved, thereby implementing flexibility of activating the SRS unit by using the DCI.

Figure 23:
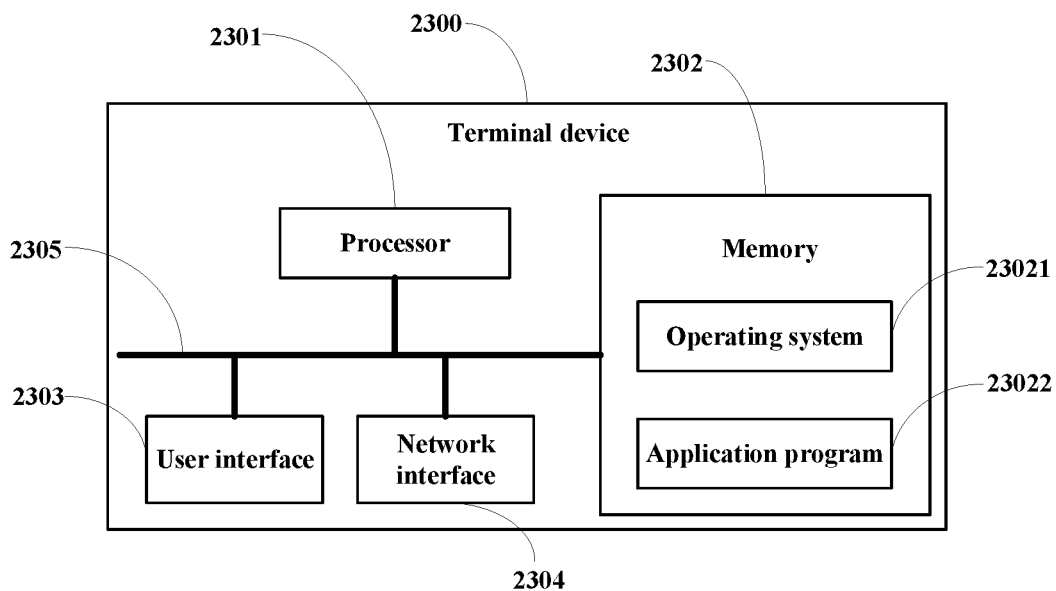
FIG. 23 is a schematic structural diagram of a terminal device according to another embodiment of the present disclosure.

FIG. 23 is a block diagram of a terminal device according to another embodiment of the present disclosure. The terminal device 2300 shown in FIG. 23 includes at least one processor 2301, a memory 2302, at least one network interface 2304, and a user interface 2303. All components in the terminal device 2300 are coupled together through a bus system 2305. It can be understood that the bus system 2305 is configured to implement connection and communication between these components. In addition to a data bus, the bus system 2305 further includes a power bus, a control bus, and a status signal bus. However, for clear description, various buses are marked as the bus system 2305 in FIG. 23.

The user interface 2303 may include a display, a keyboard, or a clicking device (for example, a mouse, a trackball), a touch panel, or a touchscreen.

It can be understood that the memory 2302 in this embodiment of the present disclosure may be a volatile memory or a non-volatile memory, or may include both a volatile memory and a non-volatile memory. The nonvolatile memory may be a Read-only Memory (ROM), a Programmable ROM (PROM), an Erasable PROM (EPROM), an Electrically EPROM (EEPROM), or a flash memory. The volatile memory may be a Random Access Memory (RAM), used as an external cache. Through example but not limitative description, many forms of RAMs may be used, for example, a Static RAM, (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). The memory 2302 in the system and the method that are described in the embodiments of the present disclosure is to include but is not limited to these memories and any other suitable types of memories.

In some implementation manners, the memory 2302 stores the following element, an executable module or a data structure, or a subset thereof, or an extension set thereof: an operating system 23021 and an application 23022.

The operating system 23021 includes various system programs, for example, a framework layer, a kernel library layer, and a driver layer, and is configured to implement various basic services and process hardware-based tasks. The application program 23022 includes various application programs, for example, a media player and a browser, and is configured to implement various application services. A program for implementing the method in this embodiment of the present disclosure may be included in the application program 23022.

In this embodiment of the present disclosure, the terminal device 2300 further includes a computer program that is stored in the memory 2309 and that can be run on the processor 2301, and when the computer program is executed by the processor 2301, the following steps are implemented:

receiving downlink control information DCI, where the DCI is used to activate an aperiodic sounding reference signal SRS unit; and sending the SRS unit in at least one valid window corresponding to the activated SRS unit.

The method disclosed in the foregoing embodiment of the present disclosure may be applied to the processor 2301, or implemented by the processor 2301. The processor 2301 may be an integrated circuit chip having a signal processing capability. During implementation, each step of the foregoing method may be completed by using an integrated logic circuit of hardware in the processor 2301 or an instruction in a form of software. The processor 2301 may be a general purpose processor, a Digital Signal Processor (DSP), an Application Specific Integrated Circuit (ASIC), a Field Programmable Gate Array (FPGA), another programmable logic device, a discrete gate, a transistor logic device, or a discrete hardware component. The processor may implement or perform the methods, the steps, and logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and accomplished through a hardware decoding processor, or may be executed and accomplished by using a combination of hardware and software modules in the decoding processor. The software module may be located in a mature computer-readable storage medium in this field such as a random access memory, a flash memory, a read-only memory, a programmable read-only memory, an electrically erasable programmable memory, a register, or the like. The computer-readable storage medium is located in the memory 2302, and the processor 2301 reads information from the memory 2302 and completes the steps of the foregoing method in combination with its hardware. The computer-readable storage medium stores a computer program, and when the computer program is executed by the processor 2301, the steps of the foregoing embodiment for triggering an aperiodic SRS resource set are implemented.

It can be understood that the embodiments described in the present disclosure may be implemented by hardware, software, firmware, middleware, microcode, or a combination thereof. For hardware implementation, a processing unit may be implemented in one or more Application Specific Integrated Circuits (ASIC), Digital Signal Processing (DSP), DSP Device (DSPD), Programmable Logic Device (PLD), Field-Programmable Gate Array (FPGA), general purpose processors, controllers, microcontrollers, microprocessors, or other electronic units or a combination thereof used to perform the functions in the present disclosure.

For implementation with software, technologies described in the embodiments of the present disclosure may be implemented by using a module (for example, a process or a function) that performs the function in the embodiments of the present disclosure. A software code may be stored in the memory and executed by the processor. The memory may be implemented in the processor or outside the processor.

In some embodiments, when the computer program is executed by the processor 2301, the following steps may be further implemented: obtaining parameter information of the SRS unit, where the parameter information of the SRS unit is configured by a network device.

In some embodiments, the SRS unit includes a plurality of SRS resource sets, and the parameter information includes a slot offset corresponding to each SRS resource set; and when the computer program is executed by the processor 2301, at least one of the following steps may be further implemented:

sending the plurality of SRS resource sets in different valid slots; or sending at least one SRS resource set at different symbol locations of a same valid slot.

In some embodiments, when the computer program is executed by the processor 2301, the following step may be further implemented:

sequentially sending each SRS resource set in at least one valid slot according to an SRS resource set sequence, where the SRS resource set sequence is determined based on at least one of the following: a slot offset corresponding to each SRS resource set, a resource identifier of each SRS resource included in each SRS resource set, or a symbol location in each SRS resource.

In some embodiments, when the computer program is executed by the processor 2301, the following steps may be further implemented:

sending the $u^{th}$ SRS resource set in the $(n+x_u+y_u)^{th}$ valid slot, where n is a second initial slot, $x_u$ is a slot offset corresponding to the $u^{th}$ SRS resource set, and $y_u$ is a slot offset of a valid slot corresponding to the $u^{th}$ SRS resource set relative to the second initial slot and the $u^{th}$ SRS resource set, where each SRS resource set corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set; and an offset starting point of the slot offset corresponding to each SRS resource set is the second initial slot.

In some embodiments, when the computer program is executed by the processor 2301, the following steps may be further implemented:

sending the $u^{th}$ SRS resource set in the $(n+\Sigma_{i=1}^{u}x_i+\Sigma_{i=1}^{u}y_i)^{th}$ valid slot, where n is a second initial slot, $x_i$ is a slot offset corresponding to the $i^{th}$ SRS resource set, $y_i$ is a slot offset obtained after a valid slot corresponding to the $i^{th}$ SRS resource set is shifted by $x_i$ relative to a valid slot corresponding to the $(i-1)^{th}$ SRS resource set, and $y_1$ is a slot offset obtained after a valid slot corresponding to the first SRS resource set is shifted by $x_1$ relative to the second initial slot;

each SRS resource set corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set; and an offset starting point of a slot offset corresponding to the first SRS resource set is the second initial slot, and an offset starting point of a slot offset corresponding to each of other SRS resource sets except the first SRS resource set is a valid slot corresponding to a previous SRS resource set.

In some embodiments, in a case that each SRS resource set corresponds to one valid window, a length of the valid window corresponding to each SRS resource set is less than or equal to a length of a valid window corresponding to a previous SRS resource set; or a length of the valid window corresponding to each SRS resource set is greater than or equal to a length of a valid window corresponding to a previous SRS resource set.

In some embodiments, the SRS unit includes at least one SRS resource in one SRS resource set; and the parameter information includes a slot offset corresponding to the SRS resource set and a slot offset corresponding to the at least one SRS resource, or the parameter information includes a slot offset corresponding to the at least one SRS resource; and when the computer program is executed by the processor 2301, the following steps may be further implemented:

sending the at least one SRS resource in a valid slot corresponding to the at least one SRS resource, where the valid slot corresponding to the at least one SRS resource is determined based on the slot offset corresponding to the at least one SRS resource, or the valid slot corresponding to the at least one SRS resource is determined based on the slot offset corresponding to the SRS resource set and the slot offset corresponding to the at least one SRS resource.

In some embodiments, when the computer program is executed by the processor 2301, the following steps may be further implemented:

sequentially sending each SRS resource in at least one valid slot in the slot window according to an SRS resource sequence, where the SRS resource sequence is determined based on at least one of the following: a slot offset corresponding to each SRS resource, a resource identifier of each SRS resource, or a symbol location in each SRS resource.

In some embodiments, when the computer program is executed by the processor 2301, the following steps may be further implemented:

in a case that the slot offset corresponding to the SRS resource set is not configured or invalid, sending the $u^{th}$ SRS resource in the $(n+x_u+y_u)^{th}$ valid slot, where an offset starting point of the slot offset corresponding to each SRS resource is a second initial slot; or in a case that the slot offset corresponding to the SRS resource set is configured and valid, sending the $u^{th}$ SRS resource in the $(n+x+x_u+y_u)^{th}$ valid slot, where n is a second initial slot, x is the slot offset corresponding to the SRS resource set, an offset starting point of the slot offset corresponding to the SRS resource set is the second initial slot, and an offset starting point of the slot offset corresponding to each SRS resource is a valid slot corresponding to the SRS resource set, where $x_u$ is a slot offset corresponding to the $u^{th}$ SRS resource, and $y_u$ is a slot offset of a valid slot corresponding to the $u^{th}$ SRS resource relative to the second initial slot and the $u^{th}$ SRS resource; and each SRS resource corresponds to at least one valid window, and a window starting point of each of the at least one valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource.

In some embodiments, when the computer program is executed by the processor 2301, the following steps may be further implemented:

in a case that the slot offset corresponding to the SRS resource set is not configured or invalid, sending the $u^{th}$ SRS resource in the $(n+\Sigma_{i=1}^{u}x_i+\Sigma_{i=1}^{u}y_i)^{th}$ valid slot, where an offset starting point of a slot offset corresponding to the first SRS resource is a second initial slot, and an offset starting point of a slot offset corresponding to each of other SRS resources except the first SRS resource is a valid slot corresponding to a previous SRS resource; or in a case that the slot offset corresponding to the SRS resource set is configured and valid, sending the $u^{th}$ SRS resource in the $(n+x+\Sigma_{i=1}^{u}x_i+\Sigma_{i=1}^{u}y_i)^{th}$ valid slot, where an offset starting point of the slot offset corresponding to the SRS resource set is a second initial slot, an offset starting point of a slot offset corresponding to the first SRS resource is a valid slot corresponding to the SRS resource set, and an offset starting point of a slot offset corresponding to each of other SRS resources except the first SRS resource is a valid slot corresponding to a previous SRS resource, where n is the second initial slot, x is the slot offset corresponding to the SRS resource set, $x_i$ is a slot offset corresponding to the $i^{th}$ SRS resource, $y_i$ is a slot offset obtained after a valid slot corresponding to the $i^{th}$ SRS resource is shifted by $x_i$ relative to a valid slot corresponding to the (i−1)$^{th}$ SRS resource, and y$_1$ is a slot offset obtained after a valid slot corresponding to the first SRS resource set is shifted by x$_1$ relative to the second initial slot; and each SRS resource corresponds to at least one valid window, and a window starting point of each valid window is the second initial slot; or a window starting point of the first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set.

In some embodiments, in a case that each SRS resource corresponds to one valid window, a length of the valid window corresponding to each SRS resource is less than or equal to a length of a valid window corresponding to a previous SRS resource; or a length of the valid window corresponding to each SRS resource is greater than or equal to a length of a valid window corresponding to a previous SRS resource.

In some embodiments, y$_u$ is less than or equal to a length of the valid window.

In some embodiments, y$_u$ is greater than or equal to y$_{u−1}$; and y$_{u−1}$ is a slot offset of a valid slot corresponding to the (u−1)$^{th}$ SRS resource relative to the second initial slot and the (u−1)$^{th}$ SRS resource.

In some embodiments, a mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

where n is the second initial slot, m is the first initial slot, $\mu_{SRS}$ corresponds to a subcarrier spacing of the SRS unit, and $\mu_{PDCCH}$ corresponds to a subcarrier spacing of a PDCCH.

In some embodiments, the valid window includes or does not include the window starting point, and the slot offset includes or does not include the offset starting point.

In some embodiments, the valid slot is the first slot in which available symbol resources of all SRS resources in one SRS resource set can be transmitted in a valid window corresponding to the SRS resource set; and/or the valid slot is the first slot in which available symbol resources of one SRS resource can be transmitted in a valid window corresponding to the SRS resource.

In some embodiments, the valid window is infinitely long or is invalid.

The terminal device 2300 can implement the processes and the effects implemented by the terminal device in the foregoing embodiment. To avoid repetition, details are not described herein again.

In the foregoing embodiment, when the DCI is used to activate the SRS unit (for example, a plurality of SRS resources in one SRS resource set or a plurality of SRS resource sets), sending and receiving of the SRS unit can be completed in the at least one valid window. Therefore, a problem that PDCCH resources are congested or antenna switching fails when at least one piece of DCI is used to simultaneously activate a plurality of SRS resources in at least one SRS resource set or a plurality of SRS resource sets is resolved, thereby implementing flexibility of activating the SRS unit by using the DCI.

Figure 24:
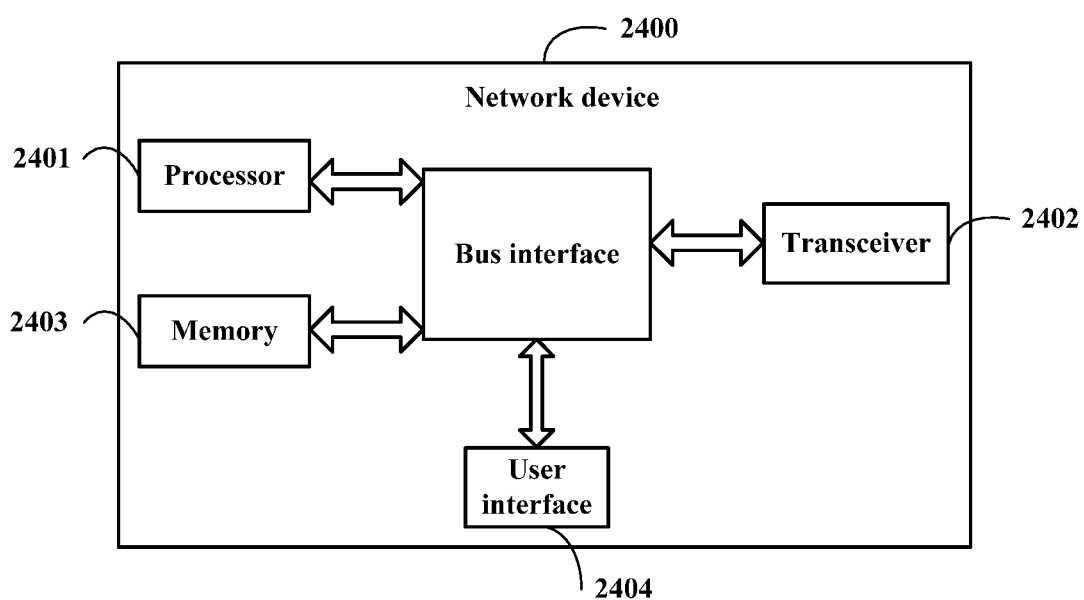
FIG. 24 is a schematic structural diagram of a network device according to another embodiment of the present disclosure.

Referring to FIG. 24, FIG. 24 is a structural diagram of a network device to which the embodiments of the present disclosure are applied, which can implement details of the method for triggering an aperiodic SRS resource set performed by the network device in the foregoing embodiment, and achieve a same effect. As shown in FIG. 24, the network device 2400 includes a processor 2401, a transceiver 2402, a memory 2403, a user interface 2404, and a bus interface.

In this embodiment of the present disclosure, the network device 2400 further includes a computer program that is stored in the memory 2403 and that can be run on the processor 2401, and when the computer program is executed by the processor 2401, the following steps are implemented:

sending downlink control information DCI, where the DCI is used to activate an aperiodic sounding reference signal SRS unit; and receiving the SRS unit in at least one valid window corresponding to the activated SRS unit.

In FIG. 24, a bus architecture may include any quantity of interconnected buses and bridges, and is linked by various circuits of one or more processors represented by the processor 2401 and a memory represented by the memory 2403. The bus architecture may further link various other circuits such as a peripheral device, a voltage regulator, and a power management circuit together. These are all well-known in the art, and therefore are not further described in this specification. The bus interface provides interfaces. The transceiver 2402 may be multiple elements, in other words, includes a transmitter and a receiver, and provides a unit configured to communicate with various other apparatuses on a transmission medium. For different user equipment, a user interface 2404 may be further an interface capable of connecting externally and internally a required device. The connected device includes but is not limited to a keypad, a display, a speaker, a microphone, a joystick, and the like.

The processor 2401 is responsible for managing the bus architecture and common processing, and the memory 2403 may store data used when the processor 2401 performs an operation.

In some embodiments, when the computer program is executed by the processor 2401, the following step may be further implemented:

configuring parameter information of the aperiodic SRS unit.

In some embodiments, the SRS unit includes a plurality of SRS resource sets; and when the computer program is executed by the processor 2401, the following steps may be further implemented:

in a case that a terminal device can only send the SRS resource sets in a same valid slot, configuring a same slot offset for the SRS resource sets; or configuring different slot offsets for the SRS resource sets; or configuring a same slot offset for a part of the SRS resource sets, where a slot offset corresponding to each SRS resource set is used to indicate a time domain location of each SRS resource set.

In some embodiments, the time domain location of the SRS resource set includes a time domain location of each SRS resource set relative to a second initial slot; or the time domain location of the SRS resource set includes a time domain location of the first SRS resource set in an SRS resource set sequence relative to the second initial slot and a time domain location of each SRS resource set relative to a previous SRS resource set; and the SRS resource set sequence is determined based on at least one of the following: a slot offset corresponding to each SRS resource set, a resource identifier of an SRS resource included in each SRS resource set, or a symbol location in each SRS resource.

In some embodiments, the parameter information includes a usage; and when the computer program is executed by the processor 2401, the following step may be further implemented: configuring the same usage for the SRS resource set.

In some embodiments, the SRS unit includes at least one SRS resource in one SRS resource set; and when the computer program is executed by the processor 2401, the following steps may be further implemented:

configuring a slot offset corresponding to the SRS resource set and a slot offset corresponding to the at least one SRS resource, where the slot offset corresponding to the SRS resource set is valid or invalid; or configuring only a slot offset corresponding to the at least one SRS resource, where the slot offset corresponding to the SRS resource set is used to indicate a time domain location of the SRS resource set relative to a second initial slot, and the slot offset corresponding to the at least one SRS resource is used to indicate a time domain location of the at least one SRS resource.

In some embodiments, the time domain location of the at least one SRS resource includes a time domain location of each SRS resource relative to the second initial slot; or the time domain location of the at least one SRS resource includes a time domain location of the first SRS resource in an SRS resource sequence relative to the second initial slot and a time domain location of each SRS resource relative to a previous SRS resource; and the SRS resource sequence is determined based on at least one of the following: a slot offset corresponding to each SRS resource, a resource identifier of each SRS resource, or a symbol location in each SRS resource.

In some embodiments, when the computer program is executed by the processor 2401, the following step may be further implemented:

configuring the slot offset corresponding to the SRS resource in an aperiodic field of the SRS resource.

In some embodiments, a mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

where n is the second initial slot, m is the first initial slot, $\mu_{SRS}$ corresponds to a subcarrier spacing of the SRS unit, and $\mu_{PDCCH}$ corresponds to a subcarrier spacing of a PDCCH.

In some embodiments, the valid slot is the first slot in which available symbol resources of all SRS resources in one SRS resource set can be transmitted in a valid window corresponding to the SRS resource set; and/or the valid slot is the first slot in which available symbol resources of one SRS resource can be transmitted in a valid window corresponding to the SRS resource.

In some embodiments, when the computer program is executed by the processor 2401, the following steps may be further implemented:

directly configuring the value of the at least one valid window; or configuring values of a part of the at least one valid window, and configuring a mapping relationship between the valid windows, where the mapping relationship is configured by the network device or agreed upon by the network device and a terminal device by using a protocol; or in a case that a terminal device reports values of a plurality of valid windows, configuring the value of the at least one valid window based on the values of the plurality of valid windows; or in a case that a terminal device reports only a value of one valid window, using the value of the valid window reported by the terminal device.

In some embodiments, the valid window is infinitely long or is invalid.

In the foregoing embodiment, when the DCI is used to activate the SRS unit (for example, a plurality of SRS resources in one SRS resource set or a plurality of SRS resource sets), sending and receiving of the SRS unit can be completed in the at least one valid window. Therefore, a problem that PDCCH resources are congested or antenna switching fails when a plurality of SRS resources in at least one SRS resource set or a plurality of SRS resource sets are simultaneously activated is resolved.

An embodiment of the present disclosure further provides a network device, including a processor, a memory, and a computer program that is stored in the memory and that can be run on the processor. When the computer program is executed by the processor, the processes of the foregoing method embodiment for triggering an aperiodic SRS resource set are implemented and a same technical effect can be achieved. To avoid repetition, details are not described herein again.

An embodiment of the present disclosure further provides a terminal device, including a processor, a memory, and a computer program that is stored in the memory and that can be run on the processor. When the computer program is executed by the processor, the processes of the foregoing method embodiment for triggering an aperiodic SRS resource set are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the foregoing method embodiment for triggering an aperiodic SRS resource set are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

An embodiment of the present disclosure further provides a computer-readable storage medium. The computer-readable storage medium stores a computer program, and when the computer program is executed by a processor, the processes of the foregoing method embodiment for triggering an aperiodic SRS resource set are implemented and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. Without more restrictions, an element defined by the statement "including a . . . " does not exclude another same element in this process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present disclosure contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A method for triggering an aperiodic sounding reference signal (SRS) resource set, performed by a terminal device, comprising:
   obtaining parameter information of an aperiodic SRS unit, wherein the parameter information of the aperiodic SRS unit is configured by a network device, the aperiodic SRS unit comprises at least one SRS resource in one SRS resource set, and the parameter information comprises a slot offset corresponding to the at least one SRS resource;
   receiving downlink control information (DCI), wherein the DCI is used to activate the aperiodic SRS unit; and
   sending the aperiodic SRS unit in at least one valid window corresponding to the activated aperiodic SRS unit, wherein there is at least one valid slot in the at least one valid window,
   wherein the sending the aperiodic SRS unit in the at least one valid window corresponding to the activated aperiodic SRS unit comprises:
      sequentially sending each SRS resource in the at least one valid slot according to an SRS resource sequence, wherein the SRS resource sequence is determined based on at least one of the following: the slot offset corresponding to the each SRS resource, a resource identifier of the each SRS resource, or a symbol location in the each SRS resource, and the at least one valid slot is determined based on the slot offset corresponding to the each SRS resource,
      wherein the sequentially sending each SRS resource in the at least one valid slot comprises:
      when the slot offset corresponding to the one SRS resource set is not configured or invalid, sending a uth SRS resource in a $(n+\Sigma_{i=1}^{u}x_i+\Sigma_{i=1}^{u}y_i)^{th}$ valid slot, wherein an offset starting point of a slot offset corresponding to a first SRS resource is a second initial slot, and an offset starting point of a slot offset corresponding to each of other SRS resources except the first SRS resource is a valid slot corresponding to a previous SRS resource,
      wherein n is the second initial slot, x is the slot offset corresponding to the one SRS resource set, $x_i$ is a slot offset corresponding to a $i^{th}$ SRS resource, $y_i$ is a slot offset obtained after a valid slot corresponding to the $i^{th}$ SRS resource is shifted by $x_i$ relative to a valid slot corresponding to a $(i-1)^{th}$ SRS resource, and $y_1$ is a slot offset obtained after the valid slot corresponding to a first SRS resource set is shifted by $x_1$ relative to the second initial slot.

2. The method according to claim 1, wherein the parameter information further comprises the slot offset corresponding to the SRS resource set, the sequentially sending the each SRS resource in the at least one valid slot further comprises:
   when the slot offset corresponding to the SRS resource set is configured and valid, sending the $u^{th}$ SRS resource in a $(n+x+\Sigma_{i=1}^{u}x_i+\Sigma_{i=1}^{u}y_i)^{th}$ valid slot, wherein the offset starting point of the slot offset corresponding to the SRS resource set is the second initial slot, the offset starting point of the slot offset corresponding to the first SRS resource is the valid slot corresponding to the SRS resource set, and the offset starting point of the slot offset corresponding to each of the other SRS resources except the first SRS resource is the valid slot corresponding to the previous SRS resource, wherein
   each SRS resource corresponds to the at least one valid window, and a window starting point of each valid window is the second initial slot; or a window starting point of a first valid window in the valid windows is the second initial slot, and a window starting point of each of other valid windows is an end location of a previous valid window; or a window starting point of the first valid window in the valid windows is the second initial slot, and a window starting point of each of other valid windows is a valid slot corresponding to a previous SRS resource set.

3. The method according to claim 2, wherein the valid window comprises or does not comprise the window starting point, and the slot offset comprises or does not comprise the offset starting point.

4. The method according to claim 1, wherein when each SRS resource corresponds to one valid window, a length of the valid window corresponding to each SRS resource is less than or equal to a length of a valid window corresponding to a previous SRS resource; or a length of the valid window corresponding to each SRS resource is greater than or equal to a length of a valid window corresponding to a previous SRS resource.

5. The method according to claim 1, wherein $y_i$ is less than or equal to a length of the valid window;
   or, $y_i$ is greater than or equal to $y_{i-1}$; and
   $y_{i-1}$ is a slot offset of a valid slot corresponding to the $(i-1)^{th}$ SRS resource relative to the second initial slot and the $(i-1)^{th}$ SRS resource.

6. The method according to claim 5, wherein the valid slot is a first slot in which available symbol resources of all SRS resources in one SRS resource set is configured to be completely transmitted in a valid window corresponding to the SRS resource set; or the valid slot is the first slot in which available symbol resources of one SRS resource is configured to be completely transmitted in a valid window corresponding to the SRS resource.

7. The method according to claim 1, wherein a mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

wherein:
n is the second initial slot, m is the first initial slot, $\mu_{SRS}$ corresponds to a subcarrier spacing of the SRS unit, and $\mu_{PDCCH}$ corresponds to a subcarrier spacing of a PDCCH.

8. The method according to claim 1, wherein the valid window is infinitely long or is invalid.

9. The method according to claim 8, wherein the parameter information comprises a usage; and
the configuring parameter information of the aperiodic SRS unit further comprises: configuring the same usage for the SRS resource set.

10. A method for triggering an aperiodic sounding reference signal (SRS) resource set, performed by a network device, comprising:
configuring parameter information of an aperiodic SRS unit, wherein the parameter information of the aperiodic SRS unit is configured by a network device, the aperiodic SRS unit comprises at least one SRS resource in one SRS resource set, and the parameter information comprises a slot offset corresponding to the at least one SRS resource;
sending downlink control information (DCI), wherein the DCI is used to activate the aperiodic SRS unit; and
receiving the aperiodic SRS unit in at least one valid window corresponding to the activated aperiodic SRS unit, wherein there is at least one valid slot in the at least one valid window,
wherein the receiving the aperiodic SRS unit in the at least one valid window corresponding to the activated aperiodic SRS unit comprises:
sequentially receiving each SRS resource in the at least one valid slot according to an SRS resource sequence, wherein the SRS resource sequence is determined based on at least one of the following: the slot offset corresponding to the each SRS resource, a resource identifier of the each SRS resource, or a symbol location in the each SRS resource, and the at least one valid slot is determined based on the slot offset corresponding to the each SRS resource, or the at least one valid slot is determined based on the slot offset corresponding to the one SRS resource set and the slot offset corresponding to the each SRS resource,
wherein the sequentially receiving each SRS resource in the at least one valid slot comprises:
when the slot offset corresponding to the one SRS resource set is not configured or invalid, receiving a $u^{th}$ SRS resource in a $(n+\Sigma_{i=1}^{u} x_i + \Sigma_{i=1}^{u} y_i)^{th}$ valid slot, wherein an offset starting point of a slot offset corresponding to a first SRS resource is a second initial slot, and an offset starting point of a slot offset corresponding to each of other SRS resources except the first SRS resource is a valid slot corresponding to a previous SRS resource,
wherein n is the second initial slot, x is the slot offset corresponding to the one SRS resource set, $x_i$ is a slot offset corresponding to a $i^{th}$ SRS resource, $y_i$ is a slot offset obtained after a valid slot corresponding to the $i^{th}$ SRS resource is shifted by $x_i$ relative to a valid slot corresponding to a (i−1)th SRS resource, and $y_1$ is a slot offset obtained after the valid slot corresponding to a first SRS resource set is shifted by $x_1$ relative to the second initial slot.

11. The method according to claim 10, wherein the configuring parameter information of the aperiodic SRS unit comprises:
configuring the slot offset corresponding to the SRS resource set and the slot offset corresponding to the at least one SRS resource, wherein the slot offset corresponding to the SRS resource set is valid or invalid; or
configuring only the slot offset corresponding to the at least one SRS resource, wherein:
the slot offset corresponding to the SRS resource set is used to indicate a time domain location of the SRS resource set relative to a second initial slot, and the slot offset corresponding to the at least one SRS resource is used to indicate a time domain location of the at least one SRS resource.

12. The method according to claim 11, wherein the configuring parameter information of the aperiodic SRS unit comprises:
configuring the slot offset corresponding to the SRS resource in an aperiodic field of the SRS resource.

13. The method according to claim 11, wherein the time domain location of the at least one SRS resource comprises a time domain location of each SRS resource relative to the second initial slot; or the time domain location of the at least one SRS resource comprises a time domain location of the first SRS resource in an SRS resource sequence relative to the second initial slot and a time domain location of each SRS resource relative to a previous SRS resource.

14. The method according to claim 10, wherein a mapping relationship between the second initial slot and a first initial slot for sending the DCI is $$n = \left\lceil m * \frac{2^{\mu_{SRS}}}{2^{\mu_{PDCCH}}} \right\rceil \text{ or } n = \left\lfloor m * \frac{2^{\mu_{SRS}}}{2^{\mu_{PDCCH}}} \right\rfloor,$$

wherein n is the second initial slot, m is the first initial slot, $\mu_{SRS}$ corresponds to a subcarrier spacing of the SRS unit, and $\mu_{PDCCH}$ corresponds to a subcarrier spacing of a PDCCH.

15. The method according to claim 10, wherein the valid slot is the first slot in which available symbol resources of all SRS resources in one SRS resource set is configured to be completely transmitted in a valid window corresponding to the SRS resource set; or the valid slot is the first slot in which available symbol resources of one SRS resource is configured to be completely transmitted in a valid window corresponding to the SRS resource.

16. The method according to claim 10, wherein a value of the at least one valid window is configured in the following manner:
directly configuring the value of the at least one valid window;

configuring values of a part of the at least one valid window, and configuring a mapping relationship between the valid windows, wherein the mapping relationship is configured by the network device or agreed upon by the network device and a terminal device by using a protocol;

when the terminal device reports values of a plurality of valid windows, configuring the value of the at least one valid window based on the values of the plurality of valid windows; or when the terminal device reports only a value of one valid window, using the value of the valid window reported by the terminal device.

17. A terminal device, comprising:

a memory storing a computer program instruction; and a processor, configured to: when the computer program instruction is executed by the processor, cause the processor to perform operations comprising:

obtaining parameter information of an aperiodic SRS unit, wherein the parameter information of the aperiodic SRS unit is configured by a network device, the aperiodic SRS unit comprises at least one SRS resource in one SRS resource set, and the parameter information comprises a slot offset corresponding to the at least one SRS resource;

receiving downlink control information (DCI), wherein the DCI is used to activate the aperiodic sounding reference signal (SRS) unit; and sending the aperiodic SRS unit in at least one valid window corresponding to the activated aperiodic SRS unit, wherein there is at least one valid slot in the at least one valid window, wherein the sending the aperiodic SRS unit in the at least one valid window corresponding to the activated aperiodic SRS unit comprises:

sequentially sending each SRS resource in the at least one valid slot according to an SRS resource sequence, wherein the SRS resource sequence is determined based on at least one of the following: the slot offset corresponding to the each SRS resource, a resource identifier of the each SRS resource, or a symbol location in the each SRS resource, and the at least one valid slot is determined based on the slot offset corresponding to the each SRS resource, or the at least one valid slot is determined based on the slot offset corresponding to the one SRS resource set and the slot offset corresponding to the each SRS resource, wherein the sequentially sending each SRS resource in the at least one valid slot comprises:

when the slot offset corresponding to the one SRS resource set is not configured or invalid, sending a $u^{th}$ SRS resource in a $(n+\Sigma_{i=1}^{u}x_i+\Sigma_{i=1}^{u}y_i)^{th}$ valid slot, wherein an offset starting point of a slot offset corresponding to a first SRS resource is a second initial slot, and an offset starting point of a slot offset corresponding to each of other SRS resources except the first SRS resource is a valid slot corresponding to a previous SRS resource, wherein n is the second initial slot, x is the slot offset corresponding to the one SRS resource set, $x_i$ is a slot offset corresponding to a $i^{th}$ SRS resource, $y_i$ is a slot offset obtained after a valid slot corresponding to the $i^{th}$ SRS resource is shifted by $x_i$ relative to a valid slot corresponding to a (i−1)th SRS resource, and $y_1$ is a slot offset obtained after the valid slot corresponding to a first SRS resource set is shifted by $x_1$ relative to the second initial slot.

18. A network device, comprising:

a memory storing a computer program instruction; and a processor, configured to: when the computer program instruction is executed by the processor, cause the processor to perform operations comprising:

configuring parameter information of an aperiodic SRS unit, wherein the parameter information of the aperiodic SRS unit is configured by a network device, the aperiodic SRS unit comprises at least one SRS resource in one SRS resource set, and the parameter information comprises a slot offset corresponding to the at least one SRS resource;

sending downlink control information (DCI), wherein the DCI is used to activate the aperiodic SRS unit; and receiving the aperiodic SRS unit in at least one valid window corresponding to the activated aperiodic SRS unit, wherein there is at least one valid slot in the at least one valid window, wherein the receiving the aperiodic SRS unit in the at least one valid window corresponding to the activated aperiodic SRS unit comprises:

sequentially receiving each SRS resource in the at least one valid slot according to an SRS resource sequence, wherein the SRS resource sequence is determined based on at least one of the following: the slot offset corresponding to the each SRS resource, a resource identifier of the each SRS resource, or a symbol location in the each SRS resource, and the at least one valid slot is determined based on the slot offset corresponding to the each SRS resource, or the at least one valid slot is determined based on the slot offset corresponding to the one SRS resource set and the slot offset corresponding to the each SRS resource, wherein the sequentially receiving each SRS resource in the at least one valid slot comprises:

when the slot offset corresponding to the one SRS resource set is not configured or invalid, receiving a $u^{th}$ SRS resource in a $(n+\Sigma_{i=1}^{u}x_i+\Sigma_{i=1}^{u}y_i)^{th}$ valid slot, wherein an offset starting point of a slot offset corresponding to a first SRS resource is a second initial slot, and an offset starting point of a slot offset corresponding to each of other SRS resources except the first SRS resource is a valid slot corresponding to a previous SRS resource, wherein n is the second initial slot, x is the slot offset corresponding to the one SRS resource set, $x_i$ is a slot offset corresponding to a $i^{th}$ SRS resource, $y_i$ is a slot offset obtained after a valid slot corresponding to the $i^{th}$ SRS resource is shifted by $x_i$ relative to a valid slot corresponding to a (i−1)th SRS resource, and $y_1$ is a slot offset obtained after the valid slot corresponding to a first SRS resource set is shifted by $x_1$ relative to the second initial slot.

19. The network device according to claim 18, wherein the configuring parameter information of the aperiodic SRS unit comprises:

when a terminal device only sends the SRS resource sets in a same valid slot, configuring a same slot offset for the SRS resource sets; or configuring different slot offsets for the SRS resource sets; or configuring a same slot offset for a part of the SRS resource sets, wherein:

a slot offset corresponding to each SRS resource set is used to indicate a time domain location of the each SRS resource set.

20. The network device according to claim 18, wherein the configuring parameter information of the aperiodic SRS unit comprises:

configuring the slot offset corresponding to the SRS resource set and the slot offset corresponding to the at least one SRS resource, wherein the slot offset corresponding to the SRS resource set is valid or invalid; or configuring only the slot offset corresponding to the at least one SRS resource, wherein:

the slot offset corresponding to the SRS resource set is used to indicate a time domain location of the SRS resource set relative to a second initial slot, and the slot offset corresponding to the at least one SRS resource is used to indicate a time domain location of the at least one SRS resource.

* * * * *